US012691307B2

(12) United States Patent
Šimočko

(10) Patent No.: US 12,691,307 B2
(45) Date of Patent: Jul. 28, 2026

(54) SAFETY HARNESS WITH PSEUDO-CROSSOVER VENTRAL STRAPS HAVING TWO FOLDS

(71) Applicant: 3M INNOVATIVE PROPERTIES COMPANY, St. Paul, MN (US)

(72) Inventor: Radovan Šimočko, Banská (SK)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 356 days.

(21) Appl. No.: 18/569,290

(22) PCT Filed: Jun. 3, 2022

(86) PCT No.: PCT/IB2022/055212

§ 371 (c)(1),
(2) Date: Dec. 12, 2023

(87) PCT Pub. No.: WO2022/263966

PCT Pub. Date: Dec. 22, 2022

(65) Prior Publication Data

US 2024/0278048 A1 Aug. 22, 2024

Related U.S. Application Data

(60) Provisional application No. 63/211,076, filed on Jun. 16, 2021.

(51) Int. Cl.
*A62B 35/00* (2006.01)

(52) U.S. Cl.
CPC ...... *A62B 35/0031* (2013.01); *A62B 35/0025* (2013.01); *A62B 35/0018* (2013.01)

(58) Field of Classification Search
CPC ............ A62B 35/0018; A62B 35/0025; A62B 35/0031; A62B 35/0037; A62B 35/0006; A62B 35/0012; B64D 17/30; A45F 3/14
See application file for complete search history.

(56) References Cited

U.S. PATENT DOCUMENTS 1,920,408 A * 8/1933 Lafayette ............... B64D 17/30
24/654
1,939,062 A * 12/1933 Knight ............... A62B 35/0018
24/DIG. 30

(Continued)

FOREIGN PATENT DOCUMENTS

CH 320951 A * 4/1957 ............. B63C 11/02
DE 2531326 A1 * 1/1977

(Continued)

OTHER PUBLICATIONS

International Search Report for PCT International Application No. PCT/IB2022/055212, mailed on Feb. 3, 2023, 3 pages.
MSA Fall Protection, U.S.A, pp. 145-189.

*Primary Examiner* — Colleen M Chavchavadze
*Assistant Examiner* — Benjamin Alexander Pezzlo
(74) *Attorney, Agent, or Firm* — Kenneth B. Wood

(57) ABSTRACT

A fall-protection safety harness is configured so that when the harness is worn by a user, a first ventral strap of the harness extends from the right shoulder of the user to the right hip of the user and a second ventral strap of the harness extends from the left shoulder of the user to the left hip of the user. A first buckle portion is mounted on the first ventral strap and a second buckle portion is mounted on the second ventral step. The at least one of the ventral straps comprises at least two fold portions formed by an upper portion of the ventral strap folded at least partially onto itself and by a lower portion of the ventral strap folded at least partially onto itself, wherein the at least one strap performs a 180 degrees twist at the vertically-elongated slot of the buckle portion mounted to the ventral strap thereby forming a securing portion on the ventral strap which is located (Continued)

between the two fold portions and wherein the at least one buckle portion is secured to the at least one strap at the securing portion of the strap.

20 Claims, 10 Drawing Sheets

(56) References Cited

U.S. PATENT DOCUMENTS

| | | | | | |
|---|---|---|---|---|---|
| 2,108,066 | A | * | 2/1938 | Kuhlemann | B64D 17/30 24/313 |
| 2,108,716 | A | * | 2/1938 | Kuhlemann | B64D 17/30 24/579.11 |
| 2,464,719 | A | * | 3/1949 | Quilter | B64D 17/30 244/151 R |
| 2,531,442 | A | * | 11/1950 | Junker | F16B 45/023 24/321 |
| 2,979,028 | A | * | 4/1961 | Zakely | A62B 35/0018 297/484 |
| 3,154,272 | A | * | 10/1964 | Gold | B64D 17/30 244/151 R |
| 3,258,788 | A | * | 7/1966 | Anciaux | A61G 1/01 5/625 |
| 3,424,134 | A | * | 1/1969 | Rosenblum | A62B 35/0037 244/151 R |
| 3,559,932 | A | * | 2/1971 | Ternes | B64D 17/30 244/151 R |
| 4,712,513 | A | * | 12/1987 | Huppertsberg | A62B 35/0031 244/151 R |
| 5,203,829 | A | | 4/1993 | Fisk et al. | |
| 5,433,289 | A | * | 7/1995 | O'Rourke | A62B 35/0031 182/6 |
| 6,668,434 | B2 | | 12/2003 | Casebolt et al. | |
| 6,804,830 | B2 | | 10/2004 | Reynolds et al. | |
| 6,874,596 | B2 | * | 4/2005 | Zeissler | A62B 35/0037 182/9 |
| 7,073,627 | B2 | | 7/2006 | Casebolt et al. | |
| 8,181,319 | B2 | | 5/2012 | Johnson et al. | |
| 8,794,378 | B2 | | 8/2014 | Wolner | |
| 8,959,664 | B2 | | 2/2015 | Johnson et al. | |
| 9,174,073 | B2 | | 11/2015 | Casebolt et al. | |
| 9,993,048 | B2 | | 6/2018 | Casebolt | |
| 10,137,322 | B2 | | 11/2018 | Perner | |
| 10,799,731 | B2 | * | 10/2020 | Jacob | A62B 35/0018 |
| 11,497,947 | B2 | * | 11/2022 | Kushniruk | B65G 7/12 |
| 2002/0088836 | A1 | * | 7/2002 | Batten | A45F 3/047 224/645 |
| 2006/0137097 | A1 | * | 6/2006 | Frost | A61F 5/05825 5/628 |
| 2011/0239413 | A1 | | 10/2011 | Milbright | |
| 2012/0023638 | A1 | * | 2/2012 | Leicester | A62B 35/0025 2/69 |
| 2015/0165246 | A1 | | 6/2015 | Betcher et al. | |
| 2017/0049218 | A1 | * | 2/2017 | Moncreiff | A45F 3/04 |
| 2019/0313746 | A1 | | 10/2019 | Hetrich | |
| 2020/0406072 | A1 | | 12/2020 | Monahan et al. | |
| 2023/0330456 | A1 | * | 10/2023 | Aleksovski | A62B 35/0025 |

FOREIGN PATENT DOCUMENTS

| | | | | | |
|---|---|---|---|---|---|
| DE | 4224334 | A1 | * | 1/1994 | A62B 35/0018 |
| DE | 29617932 | U1 | * | 3/1998 | |
| DE | 10033884 | A1 | * | 1/2002 | A62B 35/0018 |
| DE | 20215653 | U1 | * | 1/2003 | A62B 35/0031 |
| DE | 102013222372 | A1 | * | 5/2015 | A62B 35/0037 |
| EP | 1162107 | A2 | * | 12/2001 | B60N 2/2812 |
| EP | 4286017 | A1 | * | 12/2023 | A62B 35/04 |
| EP | 3820578 | B1 | * | 1/2026 | |
| FR | 2321910 | A1 | * | 3/1977 | |
| FR | 2466998 | A1 | * | 4/1981 | A62B 35/0031 |
| FR | 2630897 | A1 | * | 11/1989 | A45F 3/04 |
| FR | 2847170 | B1 | | 1/2005 | |
| FR | 2945221 | A1 | * | 11/2010 | A62B 35/0037 |
| GB | 191228782 | A | * | 1/1914 | A62B 35/00 |
| GB | 272602 | A | * | 6/1927 | A62B 35/0037 |
| GB | 361859 | A | * | 11/1931 | A62B 35/00 |
| KR | 200421137 | Y1 | * | 7/2006 | A62B 35/0031 |
| WO | WO-9324182 | A1 | * | 12/1993 | A62B 35/0025 |
| WO | 2020148655 | A1 | | 7/2020 | |
| WO | WO-2022043797 | A1 | * | 3/2022 | A62B 35/0025 |
| WO | WO-2022043818 | A1 | * | 3/2022 | A62B 35/0037 |
| WO | WO-2022263966 | A2 | * | 12/2022 | A62B 35/0031 |
| WO | WO-2022264062 | A2 | * | 12/2022 | A62B 35/0031 |

* cited by examiner

SAFETY HARNESS WITH PSEUDO-CROSSOVER VENTRAL STRAPS HAVING TWO FOLDS

CROSS REFERENCE TO RELATED APPLICATIONS

This application is a national stage filing under 35 U.S.C. 371 of PCT/IB2022/055212, filed 3 Jun. 2022, which claims the benefit of U.S. Provisional Patent Application No. 63/211,076, filed 16 Jun. 2021, the disclosure of which is incorporated by reference in its/their entirety herein.

BACKGROUND

Safety harnesses are often used to reduce the likelihood of a user experiencing a fall, and/or to safely arrest the user in the event of a fall. Such harnesses are often used in combination with one or more of a lanyard, a vertical safety system or ladder climb assist system, a self-retracting lifeline, and other fall-protection equipment.

SUMMARY

In broad summary, herein is disclosed a fall-protection safety harness with first and second ventral straps and with a ventral buckle that is at least generally aligned with the sagittal plane of the user. These and other aspects will be apparent from the detailed description below. In no event, however, should this broad summary be construed to limit the claimable subject matter, whether such subject matter is presented in claims in the application as initially filed or in claims that are amended or otherwise presented in prosecution.

Figure 1:
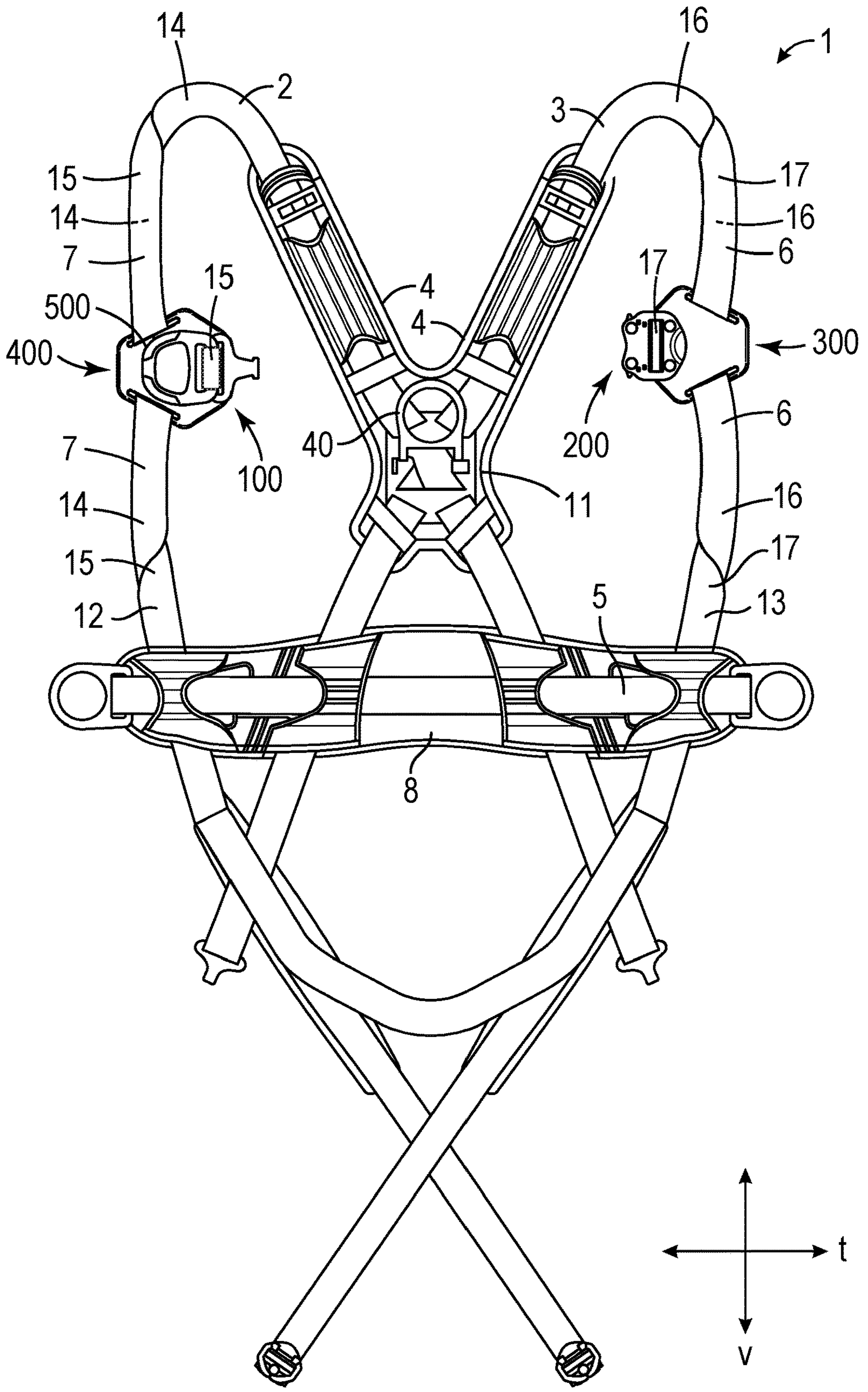
FIG. 1 is a rear view of an exemplary fall-protection safety harness equipped with exemplary first and second buckle portions.

Like reference numbers in the various figures indicate like elements. Some elements may be present in identical or equivalent multiples; in such cases only one or more representative elements may be designated by a reference number but it will be understood that such reference numbers apply to all such identical elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated. Although terms such as “first” and “second” may be used in this disclosure, it should be understood that those terms are used in their relative sense only unless otherwise noted. As used herein as a modifier to a property or attribute, the term “generally”, unless otherwise specifically defined, means that the property or attribute would be readily recognizable by a person of ordinary skill but without requiring a high degree of approximation.

The following terminology is defined with respect to a fall-protection safety harness as worn by such a user standing upright. The descriptions of positions, orientations, and so on, of harness components as disclosed herein, including in the claims, are thus with respect to the harness as worn by a user standing upright, unless stated otherwise. However, this terminology is used for clarity of description and does not limit the actual orientation of the harness and components thereof during use in a workplace.

Terms such as vertical, upward and downward, upper, lower, above and below, and like terminology, correspond to conventional directions when the harness is worn by a user who is standing upright. The vertical axis (v) is denoted in various Figures herein. The transverse direction refers to the conventional right-left direction of the user and harness, as indicated by transverse axis (t) in various Figures herein. The term ventral refers to the front side of the user’s upper body and to harness portions and components located there; the term dorsal refers to the rear side of the user’s upper body and to harness portions and components located there. The dorsal-ventral direction is the direction that extends forward-rearward through the user’s body (specifically, through the torso), as indicated by dorsal-ventral axis (d-v) in various Figures herein.

Terms such as inward, unless otherwise specified, denote a direction that is inward toward the user’s body along the dorsal-ventral axis; terms such as outward, unless otherwise specified, denote a direction that is outward away from the user's body along the dorsal-ventral axis. Terms such as transversely-inward and transversely-outward are exceptions to this usage; they denote directions respectively toward and away from the sagittal plane of the user's body and of the harness, along the transverse (t) axis.

As used herein, the sagittal plane (sometimes referred to as the mid-sagittal plane) has its conventional meaning as a vertical plane that extends down the transverse centerline of the user's body to symmetrically divide the user's body into left and right portions; the term sagittal also applies to the herein-disclosed harness as worn by such a user in an upright position. A sagittal plane is depicted as item 501 in FIG. 9 of U.S. Patent Application Publication 2015/0165246, which is incorporated by reference herein for this purpose.

DETAILED DESCRIPTION

Fall-protection safety harnesses, sometimes referred to as full-body safety harnesses, are widely used in circumstances in which workers are at elevated height or are otherwise at risk of falling. A fall-protection safety harness is configured to serve in combination with a fall-protection device or apparatus such as, e.g., a self-retracting lifeline, a horizontal lifeline, a lanyard or the like, to provide fall protection. Thus in ordinary use, at least one such fall-protection device is typically connected to the safety harness, e.g., to a D-ring (or other suitable connection point) borne by the harness. Fall-protection safety harnesses will be distinguished from, for example, general-use items such as backpacks and the like.

Figure 2:
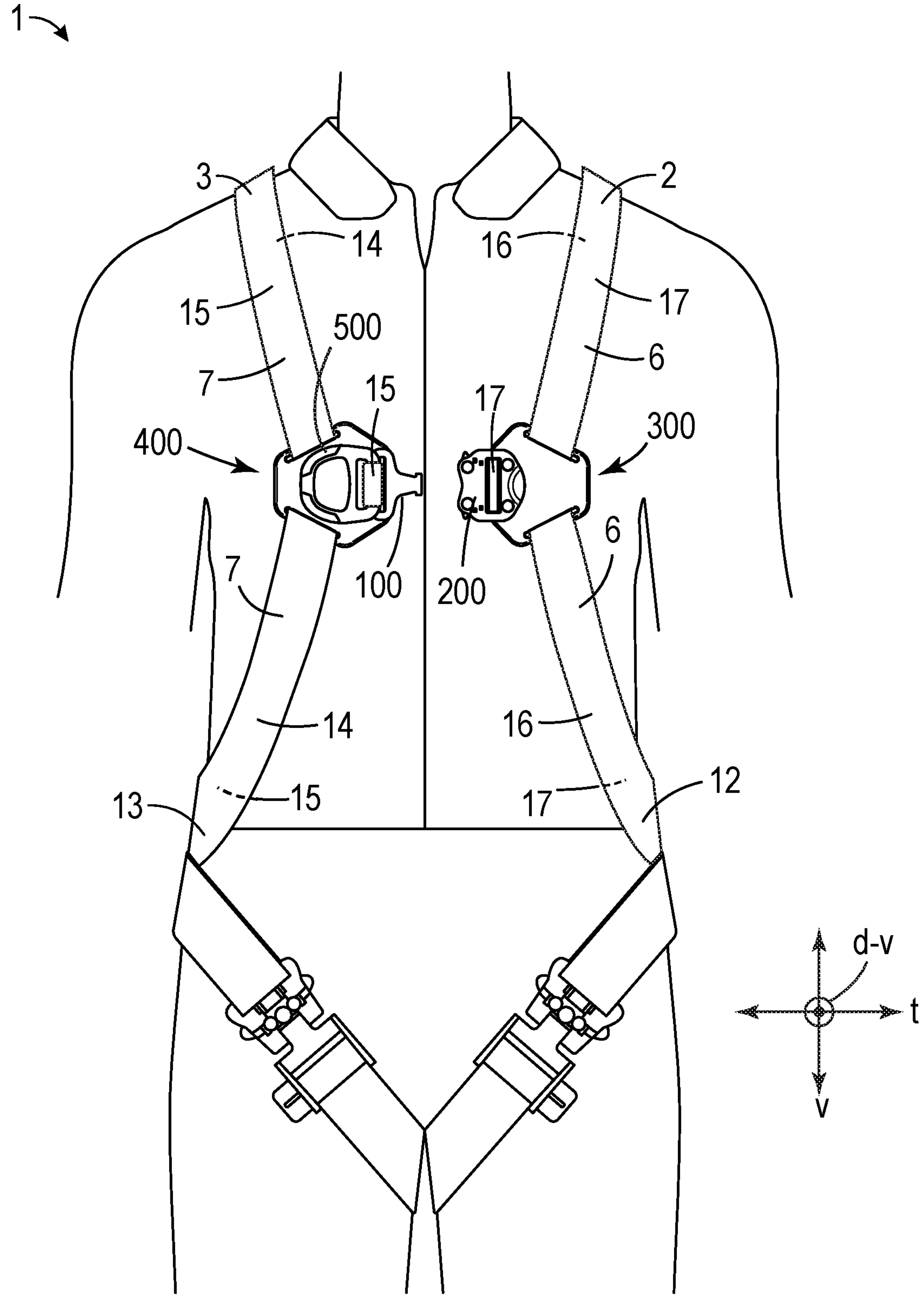
FIG. 2 is a front view of an exemplary fall-protection safety harness equipped with exemplary first and second buckle portions, with the harness partially donned by a user and with the first and second buckle portions not yet attached to each other.
Figure 3:
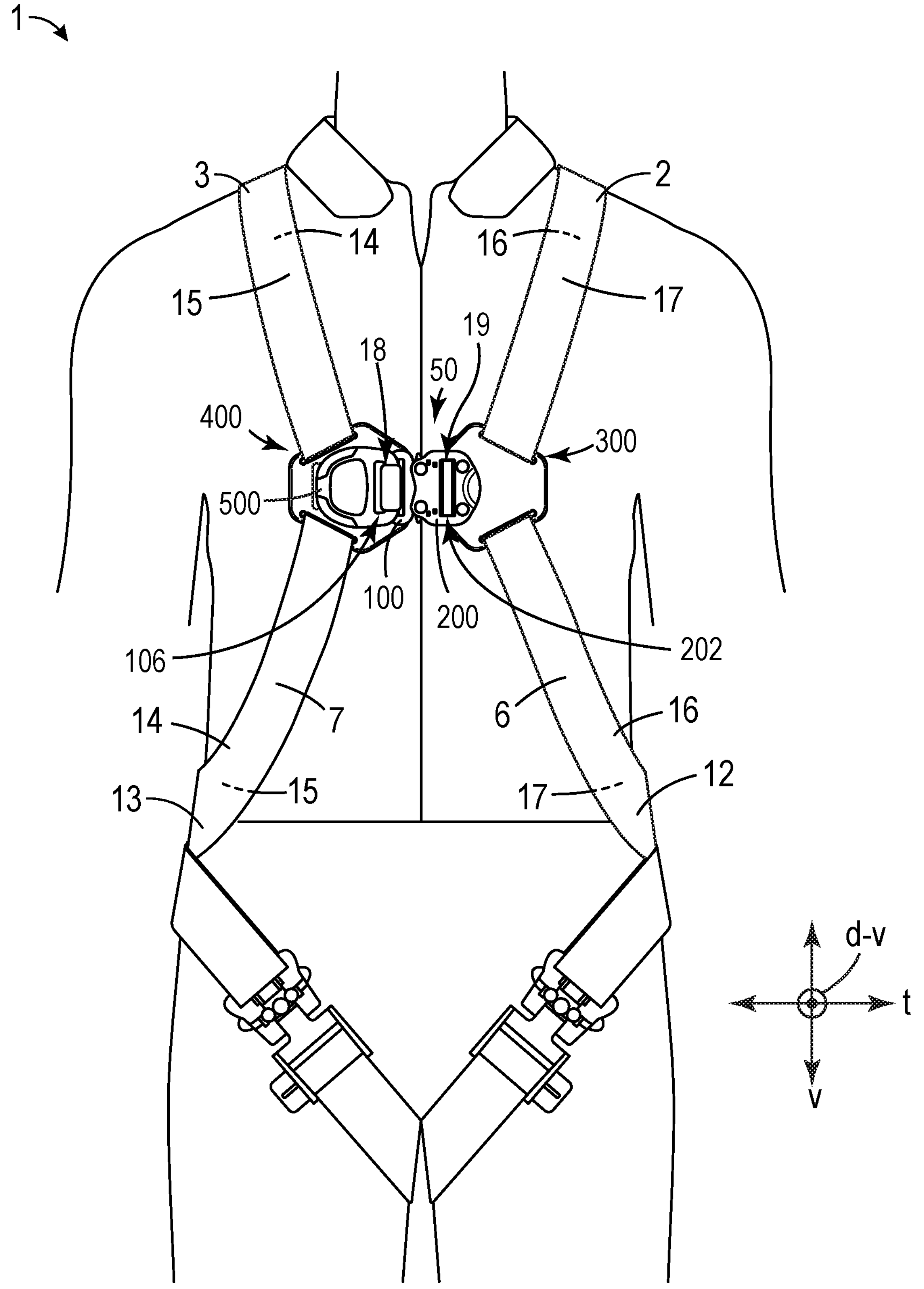
FIG. 3 is a front view of the exemplary fall-protection safety harness of FIG. 2, as fully donned by a user with the first and second buckle portions having been attached to each other to form a ventral buckle.

As illustrated in generic representation in FIGS. 1-3, a fall-protection safety harness 1 will comprise an assembly of straps and associated items that can collectively support the weight of a user (wearer) of the harness in the event of a fall. The depictions of FIGS. 1 and 2 are intended as exemplary representations; in actuality a safety harness may vary in some aspects from the particular arrangements shown in these Figures. Also, the exemplary harnesses of FIGS. 1 and 2 differ in various ways and are not to be interpreted as different views of the same harness.

The straps of such a harness are often comprised of flat webbing, made of e.g., woven synthetic fabric such as, e.g., polyamide, polyaramid (such as, e.g., Kevlar), ultra-high molecular weight polyethylene (such as, e.g., Dyneema) and the like. Such straps are typically flexible so that they can conform to the surface of a wearer's body, can be passed through one or more of buckles, guides, loops and the like, but typically are not significantly extensible. Such straps are interconnected with each other and are often fitted with various pads (e.g., shoulder pads 4 and waist/hip pad 8) to enhance the comfort of the harness, as well as various buckles, latches, connectors, loops, guides, additional pads such as, e.g., chest pads and/or leg pads, and so on. Such components and exemplary arrangements of such components are described in, for example, U.S. Pat. Nos. 8,959,664, 9,174,073, and 10,137,322, all of which are incorporated by reference in their entirety herein.

A safety harness 1 typically includes first and second (right and left) straps 3 and 2 that extend over the top of the user's shoulders as shown in FIGS. 2 and 3. FIG. 2 depicts a harness that has been partially donned with first and second buckle portions 100 and 200 not yet having been attached to each other; FIG. 3 depicts such a harness having been fully donned with buckle portions 100 and 200 having been attached to each other to form a ventral buckle 50 as discussed in detail later herein.

On the ventral (front) side of the wearer, shoulder straps 3 and 2 continue generally downward along the wearer's torso as seen in FIGS. 2 and 3 At such locations these straps will be referred to herein as ventral straps 7 and 6 (noting that each ventral strap is often an uninterrupted continuation of a shoulder strap, as evident from FIGS. 1-3). First and second ventral straps 7 and 6 will extend generally downward along the user's torso so that lowermost sections 12 and 13 of straps 7 and 6 will reside at or near the user's hips. Often, lowermost sections 12 and 13 of ventral straps 6 and 7 will meet and, e.g., interconnect with a strap 5 (which may be termed a waist strap, hip strap, etc.) that encircles at least a portion of the waist/hip area of the user as shown in FIG. 1. (In various harness designs, a waist strap may or may not be present.) In many embodiments, ventral straps 6 and/or 7 may each be a single piece of webbing that extends continuously from the shoulder to the hip. In other embodiments, a ventral strap 6 and/or 7 may take the form of two individual pieces of webbing that are attached to each other at some location along strap 6 or 7 (by definition, such a location will not be at the ventral buckle). All such design variations are encompassed by the term "strap" as used herein.

In many safety harness designs, the first and second shoulder straps 3 and 2, on the rear (dorsal) side of the wearer's torso, will meet, overlap and cross each other at a dorsal crossing point located, e.g., between the shoulder blades. In some embodiments, a dorsal plate 11 and/or a dorsal pad 4 (which may continue upward to serve as a shoulder pad) may be present, as in the exemplary design of FIG. 1. Often a dorsal D-ring 40 is provided at such a location as shown in FIG. 1. Some safety harnesses, e.g., multipurpose safety harnesses, harnesses specifically configured for use with a vertical or climb assist system, and so on, may comprise a ventral D-ring 500 as illustrated in various Figures herein. (D-rings may also be provided at other locations, e.g., at the hips, as evident in the exemplary design of FIG. 1.) In some embodiments, harness 1 will also include leg or thigh straps (shown, unnumbered, in FIGS. 1-3); in various embodiments some such straps may or may not be a continuation of a ventral strap.

In some embodiments a fall-protection safety harness may or may not include one or more plates (e.g., a dorsal plate as mentioned above) that may be relatively rigid (e.g., made of molded plastic and/or metal) in comparison to other, relatively flexible harness components such as pads and cushions. Although not shown in the Figures herein, in some embodiments a ventral strap 6 and/or 7 (and/or any other strap, e.g., waist strap, leg strap and so on), may be equipped with a strap adjuster that can be used to adjust the length of the strap as desired. Exemplary strap adjusters are described, e.g., in U.S. Pat. No. 8,794,378. The disclosures herein will make it clear that a ventral buckle as disclosed herein is distinguished from a strap adjuster. A harness as disclosed herein will not necessarily require, and in many embodiments will not include, a coupler strap (i.e., a generally horizontal, transversely-extending strap that extends between left and right chest straps of a conventional H-style harness to each other, as exemplified by item 202 of FIG. 1 of U.S. Pat. No. 9,993,048).

Fall-protection safety harnesses have conventionally been of two general types. In one general type of harness, one ventral strap extends from the right shoulder to the right hip of the user, and the other strap extends from the left shoulder to the left hip. Often, such ventral straps descend along the user's torso along a generally vertical, straight path. Such harnesses (which are sometimes referred to as H-style harnesses) conventionally include a coupler strap of the general type mentioned above, that extends generally transversely from one ventral strap to the other ventral strap (i.e., that forms the horizontal crossbar of the "H"). Such harnesses have the advantage that they can be donned relatively easily, e.g., in the general manner of a jacket or vest. That is, the ventral straps of such a harness can be forwardly wrapped around the upper torso, after which the chest-strap coupler is used to establish a connection between the two ventral straps.

A second general type of harness is a so-called crossover-style harness. In such a harness, one ventral strap extends from the right shoulder to the left hip, and the other ventral strap extends from the left shoulder to the right hip. (Here and elsewhere, the term shoulder refers to the general region extending from the transverse edge of the neck to the transversely-outer limit of the deltoid muscle. Similarly, the term hip encompasses the general region from the rectus abdominis muscle to the muscles and tissues laterally overlying the iliac crest). The ventral straps thus cross each other, e.g., in the vicinity of the user's breastbone. Such harnesses can have advantages in redistributing asymmetric forces that may result, e.g., from a heavy tool hanging on a user's hip. Such harnesses can also advantageously position a ventral D-ring near the transverse center of the user's torso (the sagittal plane), which can be particularly advantageous for female users and/or when the harness is used in combination with a vertical safety system, climbing-assist system, or the like. This can be achieved while advantageously having the D-ring directly connected to ventral straps rather than being connected to an above-described coupler strap. However, a crossover-style harness has the disadvantage that the harness cannot be donned like a jacket or vest. Rather, the harness must be pulled downward over the user's head in the general manner of a pullover sweater. This can be cumbersome, particularly for a novice user of the harness, and can lead to a momentarily confusing tangle of straps.

Pseudo-Crossover Design

The present design is a pseudo-crossover design which preserves the advantages of both types of harnesses. By definition, a pseudo-crossover design denotes an arrangement in which a first ventral strap 7 of the harness extends from the right shoulder of the user to the right hip of the user, and a second ventral strap 6 of the harness extends from the left shoulder of the user to the left hip of the user, as in an H-style harness. However, each ventral strap does not extend generally straight vertically downward along the user's torso in the usual manner of an H-style harness. Instead, each ventral strap, as it extends downward from the user's shoulder, deviates transversely inwardly (toward the sagittal plane of the user and harness) so that the ventral straps approach each other closely (e.g., within 10 cm) at a ventral buckle 50 in the general manner shown in FIG. 3. Then, as each ventral strap continues downward from the ventral buckle, it deviates transversely outward so that it extends to the hip that is on the same side as the shoulder from which the ventral strap originated, as evident in FIG. 3.

In some embodiments, this can be achieved by mounting a first buckle portion 100 on first ventral strap 7, and by mounting a second buckle portion 200 on second ventral strap 6, as shown in FIG. 2. When donning the harness, the two buckle portions 100 and 200 can be moved transversely inward toward each other (i.e., toward the sagittal plane of the user) and detachably attached to each other to form ventral buckle 50 as shown in FIG. 3. It will be appreciated that this can be performed in generally similar manner to the donning of an H-style harness rather than the harness having to be pulled downward over the user's head.

In a pseudo-crossover design, the ventral buckle 50 will be at least generally aligned with the sagittal plane of the user and of the harness, as is evident from FIG. 3. By this is meant that the ventral buckle will be at least generally centered with respect to the right-left (transverse) axis of the user and harness, so that the sagittal plane passes through at least some portion of the ventral buckle. Often, the sagittal plane may pass near, or very close to (e. g. within 4, 2 or 1 cm of), the transverse center of the buckle.

However, in many embodiments, no portion of either first ventral strap 7 or second ventral strap 6 will be aligned with the sagittal plane of the user and harness. In other words, in such embodiments, the ventral straps may be transversely spaced apart from each other, transversely outward from the sagittal plane, so that the sagittal plane will not pass through any portion of either ventral strap, as exemplified by the arrangement depicted in FIG. 3. Furthermore, in such embodiments, no portion of either ventral strap will be in overlapping relation with any portion of the other ventral strap, again as evident from FIG. 3. By any two (or more) items being in overlapping relation is meant that a line that passes through at least some part of one of the items, along a dorsal-ventral direction, will also pass through at least some part of the other item. It will be understood that the above conditions apply when the harness straps are all in a stable, properly and snugly fitted condition, notwithstanding that these conditions may be momentarily violated, e.g., when the user of the harness is twisting, bending, or in the process of donning the harness.

180 Degree Twist and Fold portions of Ventral Strap

In many embodiments, at least one of the first and second ventral straps 7 and/or 6, and the buckle portion (100 and/or 200) that is mounted on that ventral strap, may be configured so that the ventral strap exhibits a 180 degree twist 18, 19. In some embodiments, twists 18 and/or 19 may form a loop 18 and/or 19 on the ventral strap.

Figure 10:
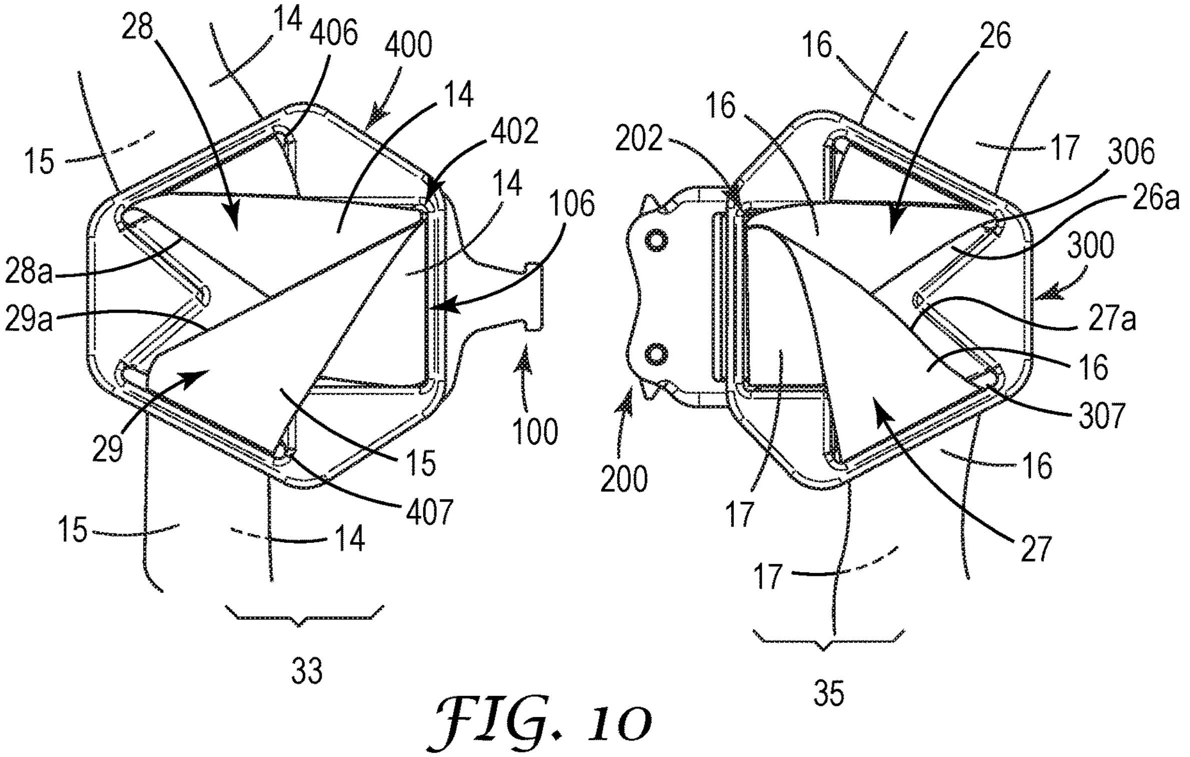
FIG. 10 is a rear view of the ventral buckle as shown in FIG. 4 including the strap routing mechanisms and the ventral straps.

In addition to the 180 degree twist, the upper portion and the lower portion of at least one of the ventral strap 7 and/or 6 comprises a fold portion 26, 27, 28, 29 incl. fold edges 26*a*, 27*a*, 28*a*, 29*a* (not visible in FIGS. 1 to 3, see FIG. 10). By a 180 degree twist is meant that as the ventral strap progresses downward along the user's torso, it goes through a 180 degree rotation about an axis of rotation that is generally aligned with the long axis of the ventral strap so that a major surface that faces inward (toward the user's body) in a section of the strap that is at the ventral buckle, faces outward (away from the user's body) in a section of the strap that is at the ventral buckle (and vice versa).

A 180 degree twist within the meaning of the present disclosure also includes a 180 degree turn or rotation of the ventral strap where the axis of rotation is generally transverse to the long axis of the ventral strap. This results in the same orientation change as described above for the twist with a rotation axis generally aligned to the long axis of the ventral strap. It is noted that the long axis generally corresponds to the vertical axis (v) as depicted in FIGS. 1 to 3. Thus, a direction transverse to the long axis of the ventral strap generally corresponds to the transverse axis (t) depicted in FIGS. 1 to 3.

The 180 degree twist forms a securing portion on the ventral strap. The securing portion prevents the two layered portions of the ventral strap passing through the vertically-elongated slot from slipping through the vertically-elongate slot. The buckle portion is secured at the ventral strap thereby. The securing portion is depicted in the FIGS. with 18, 19.

By a fold portion is meant that the ventral strap is partially folded onto itself such that a portion of the ventral strap and its major surface is brought into close proximity to (often, in contact with) with the same major surface of another portion of the ventral strap. The fold portion is arranged such that the long axis of one portion of the fold and the long axis of the other portion forming the fold portion encloses an angle. Thus, there is no total congruence of the ventral strap portions forming the fold portion. In other words, the ventral strap may be folded around a fold line or fold edge which is angled relative to the long axis of the ventral strap.

Consequently, at least one of the ventral straps 7 and/or 6 undergoes a turn three-times, i.e. two times because of the two fold portions on the upper and lower strap portions and once because of the 180 degree twist or loop.

Thus with reference to exemplary ventral strap 7 as shown in FIGS. 3, major surface 14 of strap 7 faces inward on the user's upper chest and faces outward on the user's lower abdomen; the converse is true for opposing major surface 15 of strap 7. Similarly for strap 6 of FIG. 3, major surfaces 16 and 17 respectively trade inward-outward orientations above and below the ventral buckle 50. Thus, in the depicted embodiment of FIG. 3, ventral straps 7 and 6 are each configured to comprise a 180 degree twist 18 and 19 and each of the ventral straps 7 and 6 comprise two fold portions 26, 27, 28, 29, which are not visible here (see FIG. 10). In some embodiments, only a single ventral strap may be configured in such manner. In such a case, the other strap may, for example, be configured more or less vertically (without any twist or turn) in the general manner of a ventral strap of a conventional H-style harness.

However, in many embodiments it may be advantageous to configure both of the ventral straps with a 180 degree twist and two fold portions.

Figure 9:
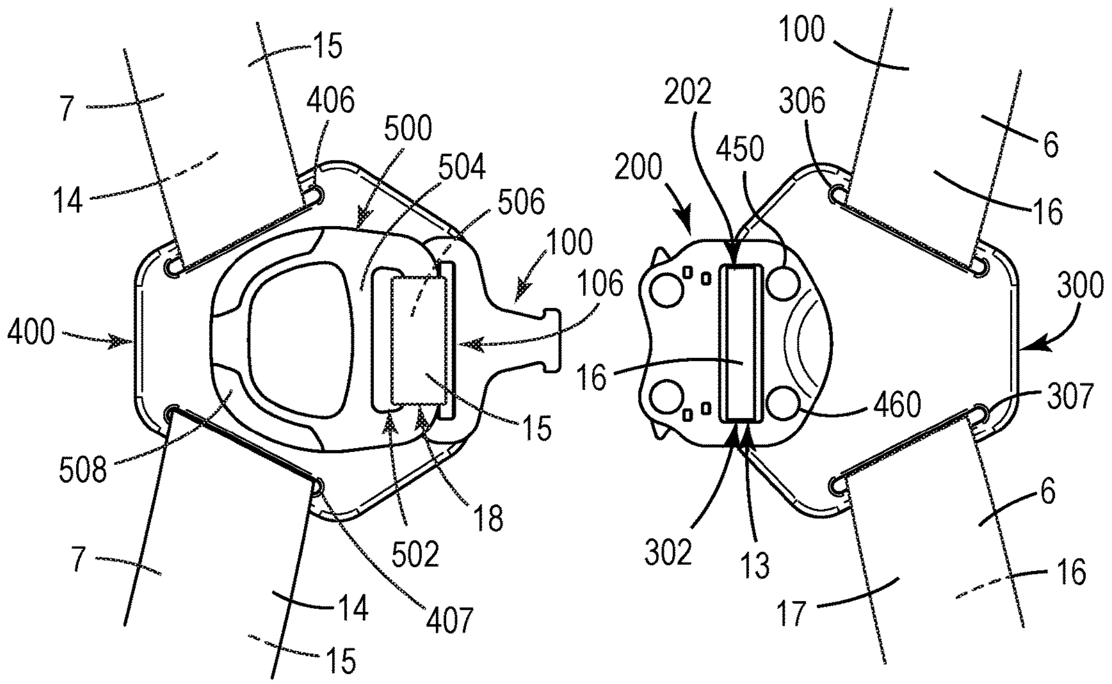
FIG. 9 is a front view of the ventral buckle as shown in FIG. 4 including the strap routing mechanisms and the ventral straps.

The buckle portion that is mounted on the ventral strap is configured to dictate that the 180 degree twist occurs at the buckle portion (as for exemplary 180 degree twists 18 and 19 depicted in FIG. 3). By "at" means within a few (e.g., 4, 2, or 1) cm of the buckle portion. Such an arrangement is promoted by providing the buckle portion with an at least generally vertically-elongated slot through which the ventral strap passes. (Such a slot may be referred to occasionally herein as a vertically-elongated slot; it will be understood that this signifies at least generally vertically-elongated unless otherwise specified.) Such slots are partially visible in FIGS. 1-3; exemplary slots of this type are more easily visible as slots 106 and 202 of buckle portions 100 and 200 as shown in FIG. 9. Specifically, two layered portions 30, 32 and/or 34, 36 of the ventral straps 7 and/or 6 pass through the vertically-elongated slots 106 and/or 202 and undergo a 180 degree twist thereafter. A loop of the strap may be formed thereby.

Figure 6:
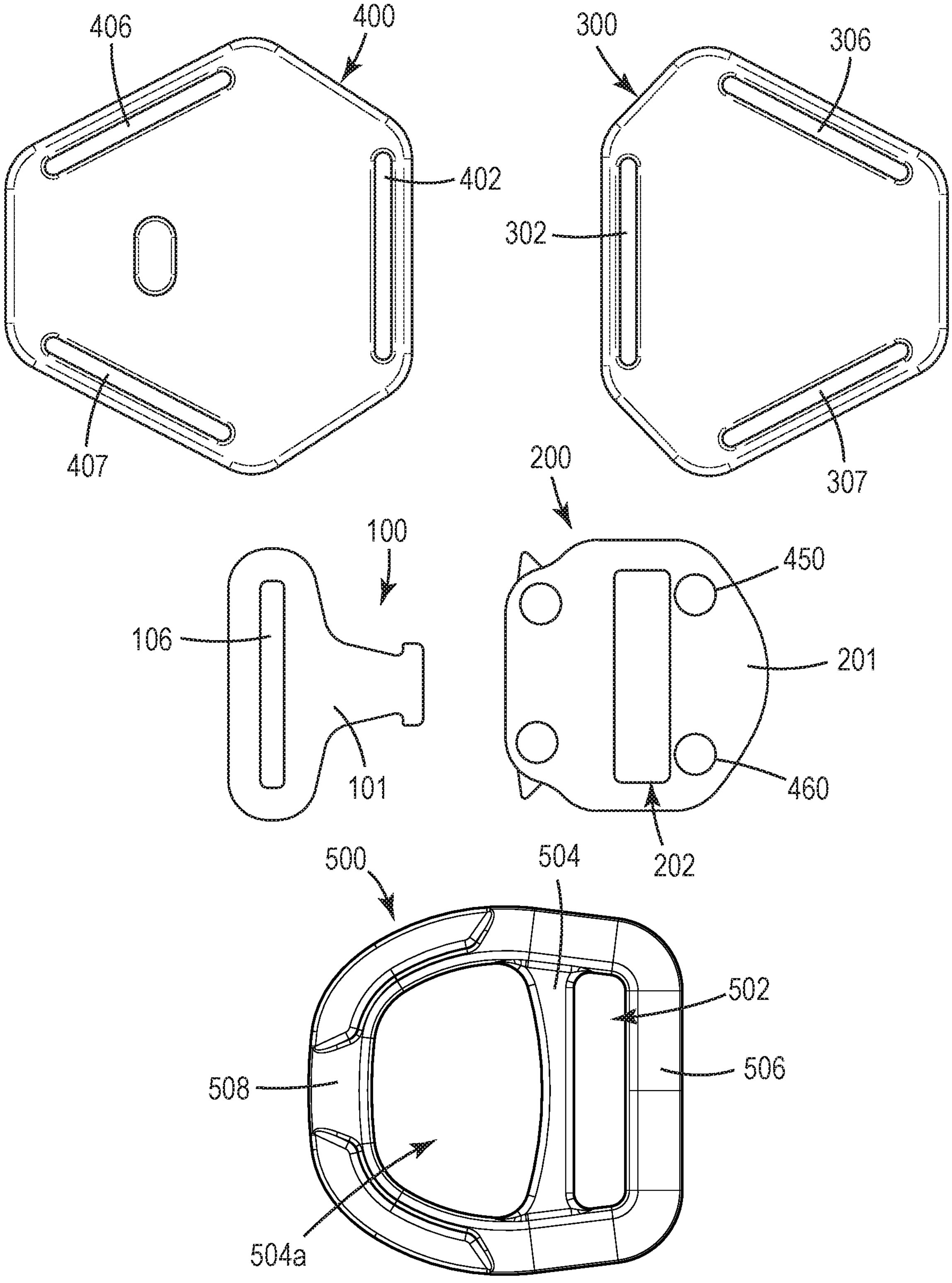
FIG. 6 is a front view of the ventral buckle, the strap routing mechanisms and the D-ring as shown in FIG. 4 separated from each other.
Figure 7:
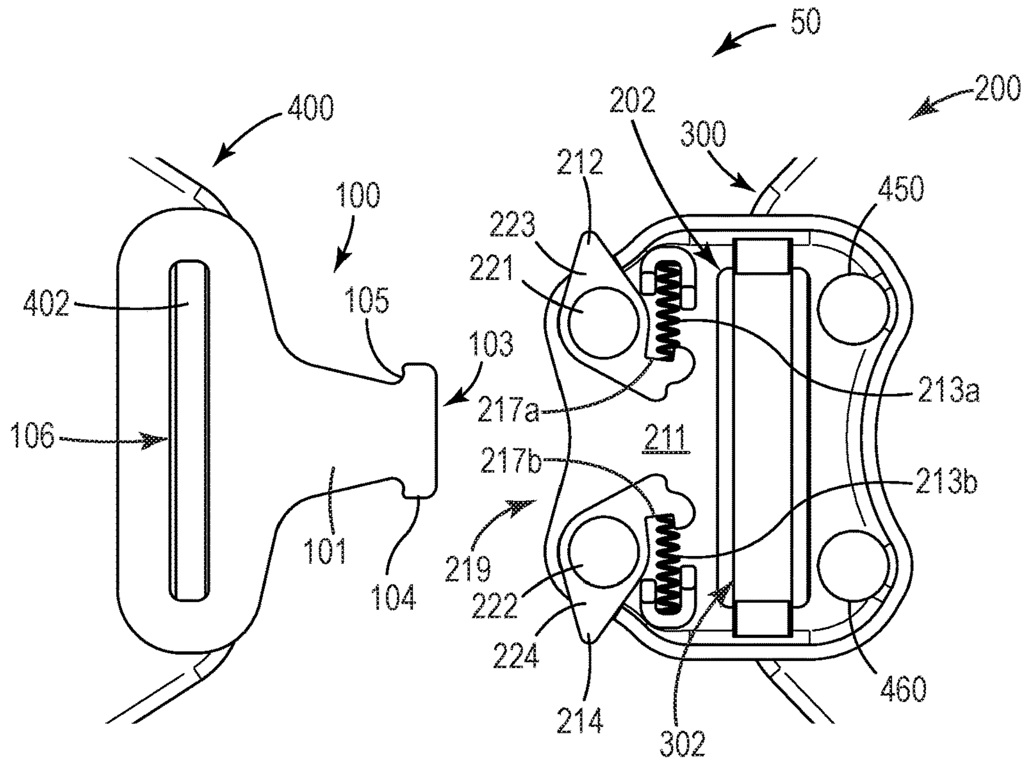
FIG. 7 is a partially cut-away front view of the exemplary first and second buckle portion of FIG. 4, where the buckle parts are separated from each other.
Figure 8:
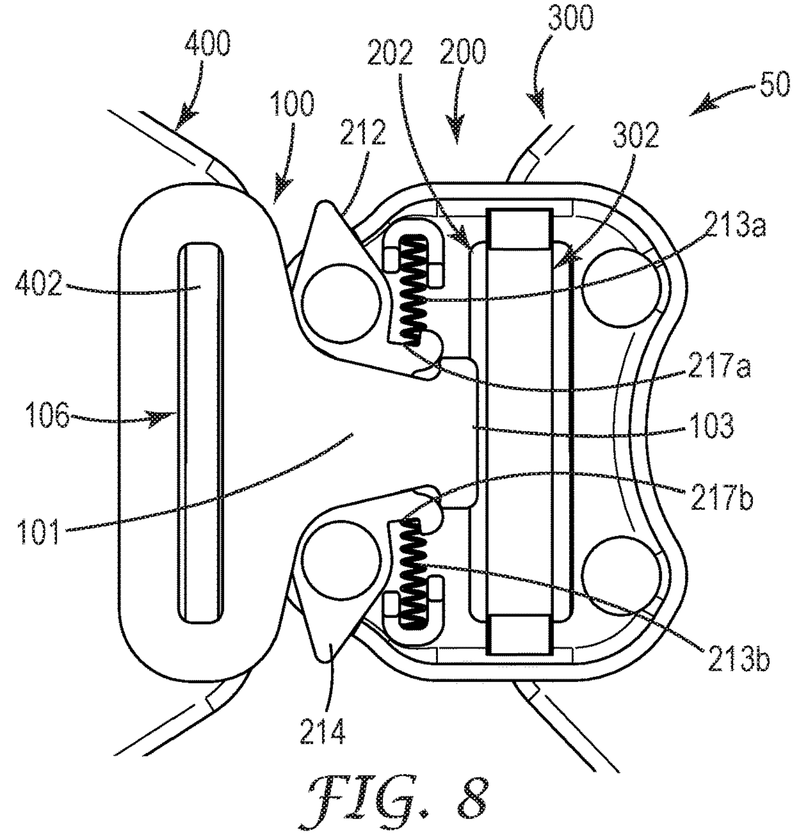
FIG. 8 is a partially cut-away front side view of the exemplary ventral buckle as shown in FIG. 6, where the buckle parts are connected to each other.

By a slot is meant a through-opening that is elongated so as to have a readily recognizable long axis and that exhibits an elongate length that is at least as great as the lateral (crossweb) width of the strap that is to pass through the slot. Some such slots will be at least generally vertically-elongated, meaning that the long axis of the slot is oriented within plus or minus 20 degrees of the vertical axis of the user and harness. In some embodiments such a slot will be at least substantially vertically-elongated, meaning that the long axis of the slot is oriented within plus or minus 10 degrees of the vertical axis. (The exemplary arrangement of FIGS. 3 and 9 depicts slots that are very close to strictly vertically oriented.) The second major dimension of the slot (e.g., the "width" of the slot, which extends along the transverse direction in FIGS. 3 and 9) need only be enough to accommodate the thickness dimension of the strap that passes through the slot. The final (third) dimension of the slot (which extends in the distal-ventral direction, e.g., in and out of plane in FIGS. 3 and 4) can be any suitable value, e.g., dictated by the thickness of the body that defines the slot. The slots 106 and 202 are also illustrated in FIG. 6 to 8 as part of the buckle parts 100 and 200, respectively.

As illustrated in exemplary manner in FIG. 3, the providing of an at least generally vertically-elongated slot through which two layered portions of the ventral strap are forced to pass, causes the ventral strap to perform a 180 degree twist at the buckle portion in which the slot is provided. In other words, the ventral strap with its two layered portions exhibits the 180 degree twist in the local area in which the ventral strap approaches, passes through, and exits the generally vertically-elongated slot. A loop of the ventral strap may be formed thereby. It is noted that the ventral strap may pass through a further slot, e.g. of a strap routing mechanism as described below.

Figure 12:
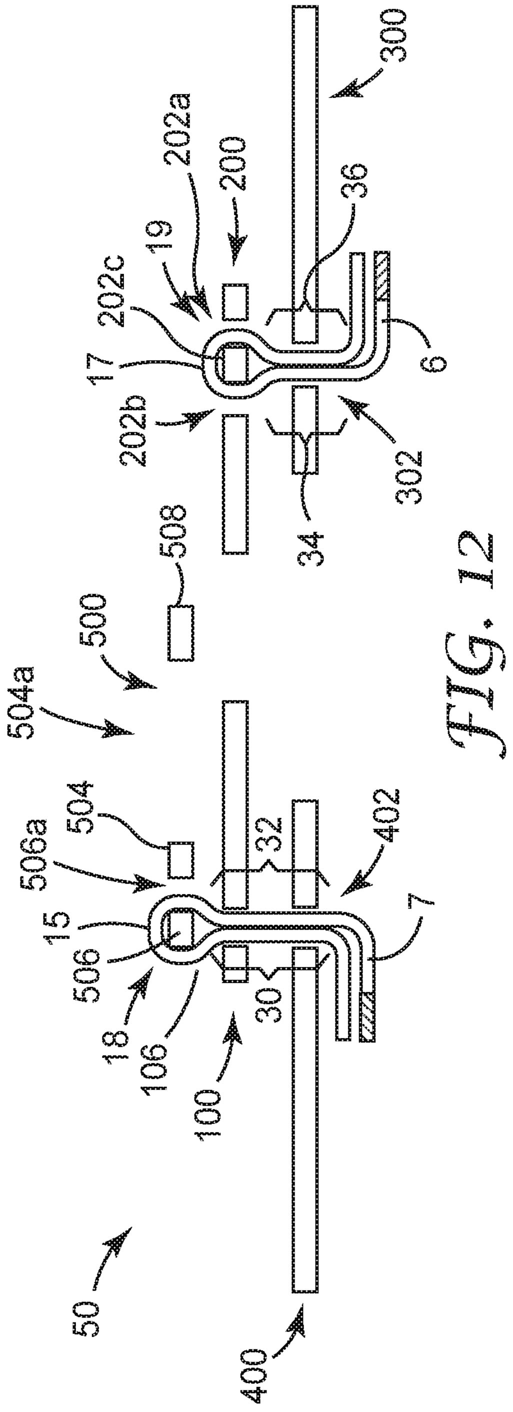
FIG. 12 is a schematic side view of the ventral buckle of FIG. 11 including the first and second ventral straps.

The two layered portions of the ventral strap may exhibit features that are indicative of a 180 degree twist, such that the two layered portions of the ventral strap are in overlapping relation with each other, as exemplified by sections 30, 32 and 34, 36 of ventral strap 7 and 6 as indicated in FIG. 12. Furthermore, in some such embodiments, at least a portion of each of these strap sections may also be in overlapping relation with an area of the buckle portion that partially defines the generally vertically-elongated slot of the buckle portion.

In the exemplary arrangement of FIG. 3, at the point of overlap, the lower portion of each ventral strap is routed outward (along the dorsal-ventral direction) of the upper portion of each ventral strap. This is optional and can easily be reversed, e.g., with the upper portion of one or both straps routed outward of the lower portion of that strap.

In some embodiments, a generally vertically-elongated slot (e.g., slot 106 or 202 of buckle portion 100 or 200) may function in a standalone manner. However, in some embodiments one or more auxiliary slots may be provided in order to enhance the guiding of the ventral straps and in particular to enhance the degree to which the 180 degree twist is compelled to occur at the generally vertically-elongated slot. An exemplary arrangement of this general type is shown in FIGS. 4 to 6 and 9 to 10. In these Figures, the fall-protection safety harness 1 further comprises a strap routing mechanism 400 having a generally vertically-elongated slot 402 that is similar in form and function to slot 106 of FIGS. 6, 7 and 8. The strap routing mechanism 400 also comprises two (upper and lower) auxiliary slots 406 and 407. Although a strap is not depicted in FIGS. 6, 7 and 8 so that other items and features can be more easily seen, it is readily apparent how a strap can be guided downward and transversely-inwardly at a desired angle that is established by slot 406, can then pass into and through vertically-elongated slot 402, and can then be guided downward and transversely-outwardly at an angle that is established by slot 407. In such a case, the 180 degree twist will occur at slot 402. For further details re. the strap guidance see FIGS. 9 and 10. In various embodiments, only a single auxiliary slot (e.g., an upper slot or a lower slot) may be present in the strap routing mechanisms 300 and/or 400; or, two (or more) auxiliary slots may be used. The angle of such a slot may be chosen as desired and will be defined in terms of the orientation of the long axis of the auxiliary slot, relative to the long axis of the vertically-elongated slot. In various embodiments such an auxiliary slot may exhibit a long axis that is oriented at an angle of at least 10, 15, 20, 25, or 30 degrees relative to the vertically-elongated slot. In further embodiments such an auxiliary slot may exhibit a long axis that is oriented at an angle of at most 60, 50, 40 or 30 degrees relative to the vertically-elongated slot. By way of a specific example, in the exemplary arrangement of FIGS. 4 to 6, auxiliary slot 306 of strap routing mechanism 300 is oriented at an angle of approximately 25 degrees relative to vertically-elongated slot 302. Similarly, auxiliary slot 307 of strap routing mechanism 300 is oriented at an angle of approximately 25 degrees relative to vertically-elongated slot 302.

In some embodiments, a strap routing mechanism 300, 400 may be present only on one side adjacent to the buckle part 100 or 200. In some other embodiments, a strap routing mechanism 300, 400 is present on both sides, i.e. adjacent to both buckle parts 100, 200 as for example shown in FIGS. 4 to 6 and 9 to 10.

Whatever the specific angle, any such auxiliary slot by definition will be oriented so that the terminal end of the auxiliary slot that is closest to the vertical midpoint of the vertically-elongated slot, will be further away from the vertically-elongated slot than the other, opposing terminal end of the auxiliary slot. (In other words, the distance from the lower end of auxiliary slot 306 to the closest point of vertically-elongated slot 302, is greater than the distance from the upper end of auxiliary slot 306 to the closest point of vertically-elongated slot 302, as is readily apparent from FIGS. 4 to 6.) When upper and lower auxiliary slots are present, such a requirement will dictate that the upper and lower auxiliary slots are oppositely-angled relative to the vertically-elongated slot, which is again apparent from FIG. 6. Given the disclosures herein, an ordinary artisan will readily understand how such an arrangement of auxiliary slots can enhance the guiding of the strap so as to promote the herein-disclosed 180 degree twisting.

Figure 4:
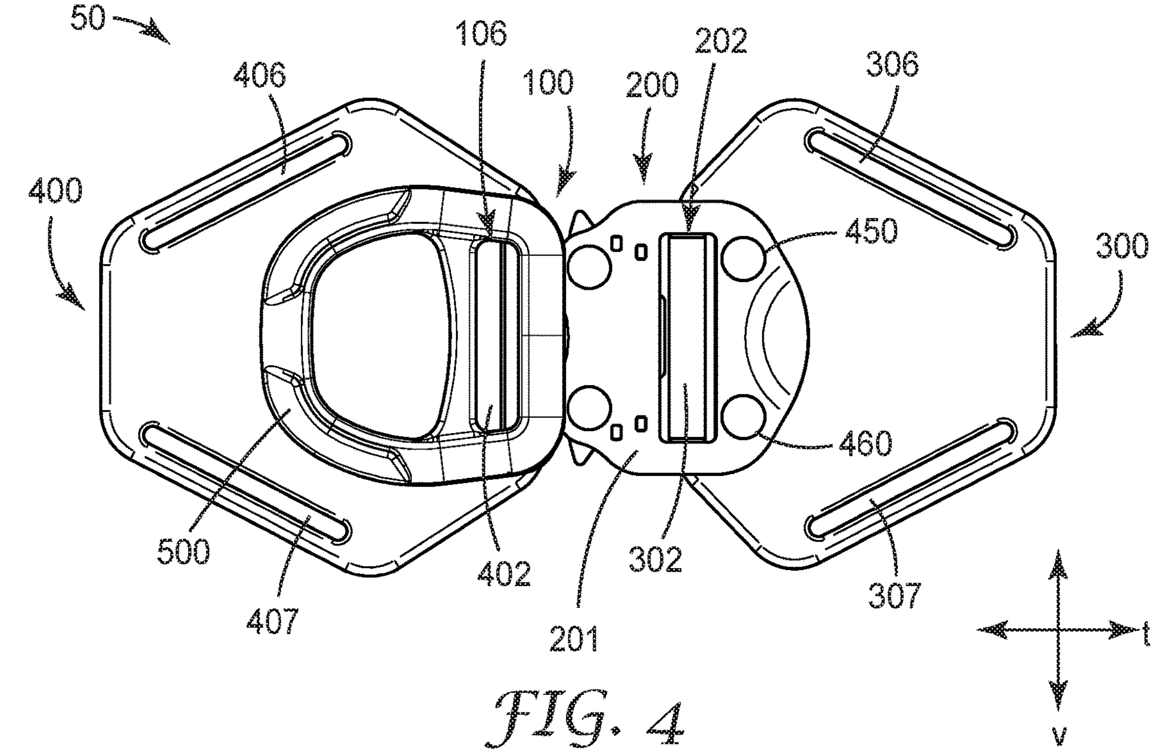
FIG. 4 is a front view of an exemplary ventral buckle including strap routing mechanisms.
Figure 5:
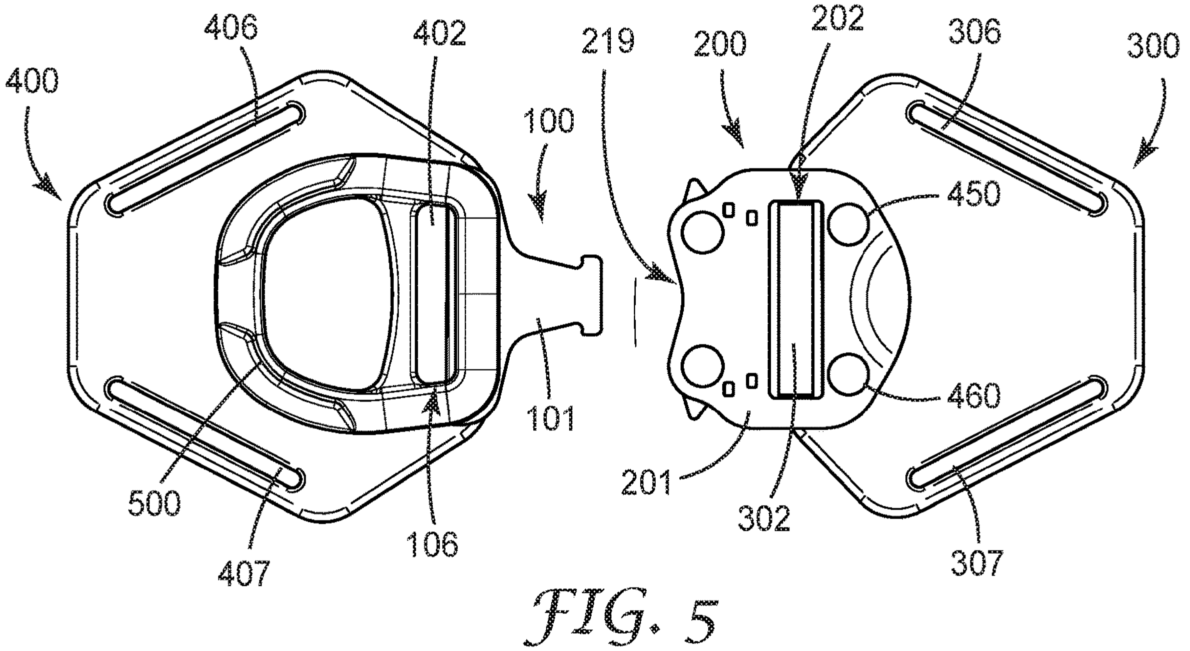
FIG. 5 is a front view of exemplary first and second buckle portions that can be attached to each other to form the ventral buckle of FIG. 4 including strap routing mechanisms.

Although not discussed in detail herein, the other buckle portion may similarly comprise one or more auxiliary slots of similar design to those discussed above. Thus in FIGS. 4 to 6, strap routing mechanism 400 that is used in association with buckle portion 100 comprises upper and lower auxiliary slots 406 and 407, in addition to vertically-elongated slot 402. Although the upper and lower auxiliary slots depicted in FIGS. 4 to 6 are symmetrical (e.g., they are oriented at equal, although opposite, angles with respect to the vertically-elongated slot that they accompany), this does not necessarily have to be the case. For example, a lower auxiliary slot may be oriented at a different angle than an upper auxiliary slot. It is noted that the arrangement and/or orientation of the vertically-elongated slot 402 and/or of the auxiliary slots 406, 407 may be in the same way as described above for the vertically-elongated slot 302 and/or for the auxiliary slots 306, 307. That is, in some embodiments the arrangements of the slots in two such buckle portions (and/or in two strap routing mechanisms used in association with the buckle portions) may be mirror-images of each other as is evident from FIGS. 4 to 6.

In some embodiments, a strap routing mechanism 300 or 400 may be provided in the form of a plate-like item (e.g. made of molded plastic, formed metal, or the like) that is separate from (i.e., not permanently attached to) the buckle portion with which it is used, as evident in FIG. 6. In some embodiments, a strap routing mechanism may be attached, e.g. permanently attached by means of rivets or the like, to the buckle portion with which it is used.

In various embodiments, at least 60, 70, 80, 90, 95, or 98 percent of the elongate length of an auxiliary slot may be positioned transversely outward of all portions of the vertically-elongated slot. By way of a specific example, in the exemplary arrangement of FIGS. 4 to 6 it appears that at least 90 percent of the elongate lengths of auxiliary slots 306 and 307 are positioned transversely outward of all portions of vertically-elongated slot 302.

In conventional design of slots and guides for straps of harnesses, a slot or guide is often chosen to have an elongate length that is only slightly greater than the lateral (crossweb) width of the strap, in order that the strap can fit through the slot. It will be appreciated that a slot as disclosed herein, which serves the specific purpose of guiding a strap through a 180 degree twist, may advantageously be chosen to have an elongate length that is significantly greater than the lateral width of the strap that passes through it. Thus in various embodiments the ratio of the elongate length of an at least generally vertically oriented slot of a buckle portion to the lateral width of the strap that passes through the slot, may be at least 1.2, 1.4, 1.6, 1.8, or 2.0. In further embodiments, this ratio may be at most 4.0, 3.5, 3.0, 2.5, 2.2, or 1.9.

A ventral buckle as disclosed herein will comprise an at least generally vertically-oriented slot as described herein (as well as any optional auxiliary slot that may be used in conjunction with it). All such slots will be configured to have a strap pass through the slot and continue onward. This will be distinguished from a buckle slot that is configured to have a strap pass therethrough so as to attach the strap to the buckle. For example, for some purposes a strap may be attached to a buckle portion by passing an end section of the strap through a slot, turning this end section of the strap back on itself, and then sewing, stitching, or otherwise attaching the strap to itself to form a terminal loop that attaches the strap to the buckle portion. Such attachment will typically be at the factory where the buckle and harness is made; the strap will typically remain attached to the buckle portion at all times. Such a buckle portion will be distinguished from a ventral buckle portion as disclosed herein.

The condition of a 180 degree twist, and in particular a stipulation that the 180 degree twist may occur at a buckle portion, e.g., as dictated by a vertically-elongated slot, is applicable when the harness is fully donned with the buckle portions having been attached to each other to form the ventral buckle, e.g., as shown in FIG. 3. With the harness not being worn (as in FIG. 1), or being partially donned (as in FIG. 2), the arrangements and geometric relationships disclosed herein may not be as apparent. Thus, whether or not a ventral strap exhibits a 180 degree twist as described herein will be evaluated with the harness fully donned and properly fitted to a user in the manner required by the manufacturer. In particular, the arrangements disclosed herein, in which a 180 degree twist is purposefully incorporated into a ventral strap of a harness, will be distinguished from situations in which, for example, a ventral strap becomes twisted due to a user donning the harness incorrectly (e.g., accidentally twisting a strap). In the present arrangements, the 180 degree twist is built in to the ventral strap as the harness is made at the factory, e.g., by attaching (e.g., sewing) the various straps to each other, to buckles and so on, in a chosen, permanent configuration. In other words, the herein-disclosed 180 degree twist cannot be eliminated by untwisting the ventral strap or any strap to which it might be connected.

Exemplary buckle designs that may achieve the above-described effects are depicted in FIGS. 4 to 6 and 9 to 10. In some exemplary embodiments a ventral buckle 50 may be provided in the form of two buckle portions 100 and 200, which can be detachably attached to each other to form buckle 50. In the exemplary arrangement depicted in these Figures, first and second buckle portions 100 and 200 will respectively be "male" and "female" buckle portions, accordingly to terminology commonly used in the art to describe such buckles. (Either such buckle portion may be mounted on a left ventral strap, or on a right ventral strap.) A female buckle portion 200 will comprise an opening 219 configured to selectively receive a complementary catch 103 of male buckle portion 100, as evident in FIGS. 7 and 8. By "complementary" and "selectively" is meant that buckle portions 100 and 200 are each configured to be mateable with a counterpart buckle portion that is specifically designed to be mateable therewith. Such designs will be contrasted with, for example, "universal" buckles or connectors. (Universal buckles may be used in some embodiments if desired.)

In some embodiments, a first (e.g., female) buckle portion 100 will include a base plate and a cover plate. In various embodiments such plates (and other components associated therewith) may be made of, e.g., a metal such as steel or aluminum. Various mechanical fasteners (e.g., rivets, not shown here) may be used to permanently hold the plates together to form the buckle portion 200. Various through-holes can be provided in the plates to accommodate such fasteners. Buckle portions comprised of first and second plates in this general manner are described in detail in U.S. Provisional Patent Application No. 63/070,628, which is incorporated by reference herein in its entirety.

In some embodiments, a second buckle portion 200 will comprise at least one latch that is pivotably attached to the first buckle portion and that is configured to selectively engage a catch 103 of the first buckle portion 100 to securely lock catch 103 within an interior space (receiving cavity) 211 of second buckle portion 200. In some particular embodiments, the at least one latch may take the form of first and second pivotable latches 212, 214 as visible in FIGS. 7 and 8. Such latches may be pivotably coupled to second buckle portion 200, in such manner as to be (partially) rotatable about a rotation axis (not shown here for simplification). Thus in the illustrated embodiment, a latch 212, 214 will be pivotably connected to buckle portion 200 by way of a mechanical fastener (e.g., rivet) 221 that passes through aligned apertures of a base plate, a cover plate, and latch 212, 214, with the mechanical fastener 221 establishing the axis of rotation of the pivotable latch (some parts omitted for simplification).

In the illustrated embodiment, pivotable latches 212, 214 are inwardly-biased. In this instance, by inwardly-biased is meant that portions of the latches that will physically contact the catch of the second buckle portion when the latches are in their second, latched position (i.e., "shoulders", not visible here) are biased inward, toward each other. Such biasing may be achieved e.g., by the use of biasing members 213*a*, 213*b* as shown in FIGS. 7 and 8. In some embodiments, biasing members 213*a*, 213*b* may take the form of coil springs 213*a*, 213*b* that are mounted in compression in channels 217*a*, 217*b* respectively provided in base plate and latch 212, 214. Such an arrangement is depicted in FIGS. 7 and 8.

Such an arrangement of a second buckle portion 200 comprising pivotable, inwardly-biased latches 212, 214 may be used in combination with a first buckle portion 100 (e.g., a "male" portion) bearing a generally T-shaped catch 103 that extends from a main body 201 and that comprises protruding teeth 104 as shown in FIGS. 7 and 8. As catch 103 is inserted into opening 219 of second buckle portion 200 (as indicated by the arrow in FIG. 7), catch 103 will enter the receiving cavity 212, 214 of the second buckle portion. The edges of the leading end of catch 103 will impinge on sloped contact surfaces of latches 212, 214 (visible in FIGS. 7 and 8) and will overcome the biasing force of springs 213*a*, 213*b* and urge latches 212, 214 to pivot in a direction that moves the shoulders of latches 212, 214 away from one another. Upon continued penetration of the catch deeper into cavity 212, 214, the teeth 104 of catch 103 will travel so far that latches 212, 214 are able to pivotably rotate under the biasing force of springs 213*a*, 213*b* so that shoulders of latches 212, 214 fit into spaces 105 proximate the teeth 104 of the catch. This will securely hold the catch 103103 of first buckle portion 100 within receiving cavity 212, 214 of second portion 200 thus securing the first and second buckle portions together as shown in FIGS. 7 and 8. Such a configuration of the latches will be referred to as a second, latched position.

Catch 103 cannot thereafter be removed from receiving cavity 212, 214 (thus the first and second buckle portions cannot be detached from each other) unless latches 212, 214 are manually pivotably moved (rotated) out of the second, latched position, into a first, unlatched position. To accomplish this, a user can use, e.g., the thumb and forefinger to urge manipulation portions ("ears" 114, that are exposed beyond the edges of plates of the buckle portion as shown in FIG. 5) of latches 212, 214 generally rearward (in this instance, "rearward" means away from the main body of first buckle portion 100). This will cause latches 212, 214 to rotate (overcoming the biasing force of springs 113) so that the shoulders of the latches 212, 214 move far enough apart to reach a first, unlatched position, that allows the catch 103 of the second buckle portion to be removed from the first buckle portion.

Based on the discussions above it will be appreciated that in some embodiments a latching system as disclosed herein may be automatically latching (e.g., self-latching), meaning that the engaging of the catch of the second buckle portion with the pivotable latches of the first buckle portion can occur automatically upon insertion of the catch into the receiving cavity of the first buckle portion. That is, no manipulation of the pivotable latches by the fingers of the user is required in order to attach the first and second buckle portions to each other to form the ventral buckle.

In contrast, in the depicted embodiment the disengaging of the catch from the pivotable latches to detach the buckle portions from each other requires deliberate manual actuation. That is, a preliminary step of manually pivotably moving the latches to an unlatched position (overcoming the biasing force) must be performed before the catch can be removed from the receiving cavity. Thus in at least some embodiments, the first and second buckle portions can be automatically attached to each other as a consequence of moving the buckle portions toward each other; while, in contrast, a preliminary step of pivotably moving the latches to unlatch them must be manually performed in order to allow the first and second buckle portions to be detached from each other.

Based on the above discussions, it will be evident that when the buckle portions 100 and 200 are separated from each other (e.g., when the harness is not being worn by a user) the biasing force of the biasing members will cause the latches to be held in their second, latched position (although no catch will be present to be secured in the receiving cavity). To don the harness, the upper portions of the harness are wrapped forwardly about the shoulders and the right and left ventral straps are positioned on right and left sides of the upper torso. The first and second buckle portions are then moved transversely inward toward the sagittal plane of the user and toward each other, so that the catch of the second buckle portion enters the receiving cavity of the first buckle portion. The leading edges of the catch will impinge on the latches and will overcome the biasing force and urge the latches to momentarily move to the first, unlatched position to allow the catch to be captured, and the buckle portions attached to each other, as described above. In this capturing process, the latches will automatically return to the second, latched position under the influence of the biasing force.

When the harness is to be removed, the user will manually manipulate the latches to the first, unlatched position as described, and will then move the first and second buckle portions apart generally along a transverse direction of the user and harness.

It will be appreciated that the above-described first buckle portion 100 (and corresponding, complementary second buckle portion 200) is merely exemplary and that such a buckle portion may be configured as desired. Various designs of buckle portions are described in detail, e.g., in U.S. Pat. Nos. 6,668,434, 8,181,319, and 9,993,048, and in U.S. Patent Application Publication 2011/0239413, all of which are incorporated by reference in their entirety herein. In some embodiments a first buckle portion will be of a design in which an opening 219 that is configured to receive a catch of a second buckle portion, is located at an end of the first buckle portion (e.g., as depicted herein in FIG. 5 and as described in detail above). In such a design, the opening is configured to receive a catch that is moved into opening 219 along a direction that is generally aligned with the longitudinal axis of the catch. Such an arrangement will be termed an "end-mating" design and will be distinguished from, e.g., a "side-mating" design in which a major side of the first buckle portion comprises an opening (e.g., a generally T-shaped opening) provided, e.g., in a base plate or cover plate of the buckle portion, through which a catch is inserted. Such a side-mating design is shown, for example, in FIG. 14A of U.S. Pat. No. 9,993,048. It will thus be appreciated that first and second buckles that are detachably attachable to each other to form a ventral buckle as disclosed herein, can be of any suitable type or arrangement and can rely on any appropriate latch or set of latches. Any such latch or latches may be biased in any suitable way, e.g., by a coil spring mounted in compression (as in the present case), a coil spring mounted in tension, a torsion spring, by the use of a magnetic biasing element, and so on.

Whatever the specific design, by definition a ventral buckle as disclosed herein comprises (at least) two buckle portions (e.g., a female portion and a male portion) that are in direct contact with each other and are attached to each other directly, by way of metal components of the buckle portions (e.g., the above-described latches, catches, and so on). Thus, a ventral buckle as disclosed herein does not encompass an arrangement in which two "buckle portions" are attached to each other only by way of one or more flexible straps, webbing (made, e.g., of fabric) or the like. Furthermore, a ventral buckle 50 (and first and second buckle portions thereof) is an item that is configured specifically for use with body-supporting ventral straps of a fall-protection safety harness. Such a buckle will thus be distinguished from, for example, a buckle that may be used with one or more straps that are used to support the weight only of some relatively lightweight ancillary item (e.g., a hard hat, a tool, etc.) rather than being used with one or more harness straps that must take part in supporting the full weight of a user in the event of a user fall.

Whatever the specific design of the latching mechanism, any suitable first buckle portion will exhibit certain features and functionalities; similarly, any suitable second buckle portion will exhibit certain features and functionalities. For example, in many embodiments a second buckle portion 200 will comprise a main body 201 that defines a vertically-elongated slot 202 as described in detail earlier herein. In some embodiments, one or more auxiliary slots may also be present as described earlier herein. In some embodiments, main body 201 may take the form of a single, integral body (e.g., made of a metal such as steel or aluminum). In other embodiments, main body 201 may be provided by first and second metal plates held together by fasteners (e.g. rivets) as evident in the exemplary design shown in FIG. 5 and as discussed earlier herein. In some embodiments, a slot 202 of second buckle portion 200 may be provided in a slot-bearing body that is an integral extension of a base plate or a cover plate of the second buckle portion. In some embodiments it may be advantageous for such a slot-bearing body to be pivotally connected to the remaining components (e.g., a base plate and/or a cover plate) of second buckle portion 200. Thus in some embodiments, a slot 202 may be provided in a slot-bearing body from which extends a connection arm as shown in FIGS. 4 to 6. In some embodiments, a first buckle portion 100 may be of a relatively simple construction, e.g. may be comprised of a single piece of metal bearing a catch 103 and a vertically-elongated slot 106, as in the exemplary design of FIGS. 6 and 7. In some embodiments, slot 202 is formed such that it comprises two vertically-elongated slots 202*a*, 202*b* and a rod 202*c* between these. In such a case, the twist or loop 19 encompasses the rod 202*c*. In some embodiments, where only a single vertically-elongated slot 202 is provided, an additional strap securing means is provided to prevent the twist or loop 19 from slipping through the vertically-elongated slot 202. Such an arrangement is described further below in conjunction with FIGS. 13 and 15.

A ventral buckle as disclosed herein will comprise at least one D-ring 500 (with the term D-ring denoting any suitable connecting item, regardless of the exact shape of the item) to which a safety line, lanyard, or the like can be connected. D-ring is a separate component and not fixedly connected directly to the first buckle portion 100 (e.g. by one or more metal connectors) as is evident in the exemplary design of FIGS. 4-6 nor is D-ring 500 fixedly connected directly to second buckle portion 200. Instead, D-ring 500 is held in position at and is indirectly connected to the first buckle part 100 by means of a loop 18 formed from the ventral strap, wherein two layered portions of the ventral strap pass through the slot 406 of the strap routing mechanism 400 and through the vertically-elongated slot 106 of the first buckle portion 100 such that the loop 18 encompasses a part of the D-ring 500, i.e. a rod 506 as illustrated in FIGS. 9 and 12. The D-ring thus may be pivotably connected to first buckle portion 100 through the loop of the ventral strap and thus to the ventral buckle 50 formed from the first buckle portion 100 (and the complementary second buckle portion 200). In the depicted embodiment, D-ring 500 is mounted so that it is pivotable from side to side.

In some embodiments first and second buckle portions 100 and 200 may be configured so that a vertically-elongated slot 106 of first buckle portion 100 is closely held in a specific orientation with respect to vertically-elongated slot 202 of second buckle portion 200. For example, in some embodiments, when buckle portions 100 and 200 are attached to each other, slot 106 may remain parallel to slot 202, e.g., to within plus or minus 5, 2 or 1 degree, at all times. In other embodiments, the buckle portions may be configured so that some variation in the relative orientation of slots 106 and 202 is allowed or promoted. Such variation may be allowed by, for example, allowing some "play" in the ability of catch 103 to slightly move relative to latches 212, 214 (even while being held securely by the latches). Thus, in various embodiments slot 106 of first buckle portion 100 may be able to pivot at least somewhat with respect to slot 202 of second buckle portion 200, e.g., through an angle of relative rotation of at least 5, 10 or 20 degrees or more. In some embodiments, the slots are unable to rotate relative to each other through an angle of more than 15, 7 or 3 degrees. Any such rotation will be about an axis of rotation that is generally aligned with the dorsal-ventral axis of the harness and buckle and buckle portions. Obviously, since (in the depicted embodiment) arm 108 is pivotably mounted on connector 105 with respect to rotation about a vertical axis as described above, such rotation about the vertical axis may occur to any suitable amount (e.g., up to 90 degrees or more) irrespective of any rotation that may or may not be allowed about a dorsal-ventral axis.

FIGS. 9 and 10 illustrate a front and rear view of the first and second buckle portions 100, 200 including the strap routing mechanisms 400, 300 and the routing of the ventral straps 7 and 6 therethrough. As can be seen in FIG. 9, ventral strap 7 coming from the above is routed through the strap routing mechanism 400 and the slot 406. Ventral strap 7 passes through upper auxiliary slot 406. Thereafter, ventral strap 7 exhibits a folded portion 28 with a fold edge 28*a* (both not visible here due to the strap routing mechanism 400). Due to the folding of the ventral strap 7, the major surface 15, facing away from the user's body, is now facing towards the user's body (not shown here, see FIGS. 2 and 3). The opposite is true for the major surface 14, which faces the user's body and after the fold, it faces away from the user's body (not visible here, see FIGS. 2 and 3). The ventral strap 7 then passes with two layered portions 30, 32 through the vertically-elongated slot 402 forming a twist 18. In the embodiment shown, the twist 18 is formed as a loop 18 of the ventral strap 7. The loop 18 encompasses a rod 506 of the D-ring 500 thereby fixing the D-ring at the buckle portion 100 and the ventral strap 7, respectively. Due to the twist 18, the major surfaces 14, 15 are again exchanged with regard to facing towards to or away from the user's body, i.e. the major surface 14, which faces towards the user's body before the twist or loop 18, now faces away from the user's body. The opposite is true for major surface 15, which faces away from the user's body before the twist or loop 18, now faces the user's body. After the twist or loop 18, another fold portion 29 with a fold edge 29*a* is arranged oat the ventral strap 7. This results in again changing the orientation of the major surfaces 14 and 15 with regard to the user's body, so that now major surface 14 faces away from the user's body, whereas major surface 15 now faces towards the user's. Ventral strap 7 then passes through the slot 407. Transverse strap portion 33 of the ventral strap 7 is formed thereby which is oriented substantially perpendicular to the long axis or vertical axis (v) of the ventral strap (as depicted in FIGS. 1 to 3) and to the sagittal plane of the user, i.e. the transverse strap portion is oriented in parallel to the transverse axis (t) as depicted in FIGS. 1 to 3. Such a transverse strap portion may increase the distance between the ventral straps 7 and 6 and may give more design options, e.g. such an arrangement may represent a combination of a pseudo crossover design and an H-style design of the harness. FIG. 9 further indicates the routing of the ventral strap 6 through the strap routing mechanism 300 which is attached to the buckle portion 200 by fasteners 450, 460, e.g. rivets or screws. Although not shown in FIGS. 9 and 10, it is also conceivable that the strap routing mechanism 400 is attached to the buckle portion 100 in the same way. As can be seen, ventral strap 6 coming from the above with a major surface 16 facing away from the user's body and a major surface 17 facing towards the user's body passes through the upper auxiliary slot 306 and comprises a fold portion 26 with a fold edge 26*a* (both not visible due to strap routing mechanism 300) thereafter. This results in an exchange of the orientation of the major surfaces 16 and 17 in that major surface 16, after the fold, faces towards the user's body and major surface 17, after the fold, faces away from the user's body. Similar to ventral strap 7, ventral strap 6 also comprises a twist or loop 19 formed by two layered portions 34, 36 (not visible here, see FIG. 12) being in an overlap relation passing through vertically-elongated slot 302 of the strap routing mechanism 300 and two vertically-elongated slots 202*a*, 202*b* of the buckle portion 200 such that a rod 202*c* is encompassed thereby. The buckle portion 200 is secured at the ventral strap 6 therewith. Similar to ventral strap 7, ventral strap 6 then comprises another fold portion 27 with a fold edge 27*a* such that the orientation of the major surfaces 16 and 17 are again exchanged with respect to the user's body. Consequently, major surface 16 faces towards the user's body and major surface 17 faces away from the user's body after this fold. Ventral strap 6 is passing through slot 307 and is then routed further downward. FIG. 10 illustrated the buckle portions 100, 200 and the routing of the ventral straps 6 and 7 through the strap routing mechanisms 300, 400 from a rear view. As can be seen, ventral strap 7 with major surface 14 facing towards the user's body and major surface 15 facing away from the user's body coming from the above passes through slot 406. Thereafter, a folded portion 28 with a fold edge 28*a* is arranged on the ventral strap 7, wherein the major surface 15 now faces towards the user's body and wherein the major surface 14 now faces away from the user's body. As described above, the ventral strap 7 passes with two layered portions 30, 32 thereof being in an overlap relation through vertically-elongated slot 402, wherein twist or loop 18 is formed encompassing rod 506 of the D-ring 500 arranged at a side of the strap routing mechanism 400 opposite to where the fold portion 28 is arranged. Due to the twist or loop 18, major surface 14 now faces towards the user's body and major surface 15 now faces away from the user's body. Another folded portion 29 with a fold edge 29*a* is arranged at the ventral strap 7 again resulting in a change of the orientation of the major surfaces relative to the user's body. Consequently, major surface 14 now faces away from the user's body and major surface 15 now faces towards the user's body. Ventral strap 7 then passes through slot 407 and is routed further downward. Similarly, ventral strap 6 is routed through the strap routing mechanism 300. Ventral strap 6 with major surfaces 17 facing towards the user's body and major surface 16 facing away from the user's body coming from the above and passes through slot 306. Thereafter, a folded portion 26 with a fold edge 26*a* is arranged on the ventral strap 6 resulting in a change of the orientation of the major surfaces 16 and 17 so that major surface 16 now faces towards the user's body and major surface 17 now faces away from the user's body. As described above, ventral strap 6 passes with two layered portions 32, 34 (not visible here, see FIG. 12) through the vertically elongate slot 302 of the strap routing mechanism 300 and through vertically elongate slots 202*a*, 202*b* of the buckle portion 200 in a single layer configuration (not visible here, see FIG. 9). A rod 202*c* (not visible here, see FIGS. 13 and 15) of the buckle portion 200 is encompassed thereby so that the buckle portion 200 is secured at the ventral strap 6. Another fold portion 27 with a fold edge 27*a* is arranged at the ventral strap 6 so that major surface 16 now faces towards the user's body and that major surface 17 faces away from the user's body. Ventral strap 6 then passes through slot 307 and is routed further downward. Similar to the transverse strap portion 33 formed on the ventral strap 7 as described above, a transverse strap portion 35 of the ventral strap 6 is formed thereby which is oriented substantially perpendicular to the long axis of the ventral strap and to the sagittal plane of the user. Such a transverse strap portion 35 may increase the distance between the ventral straps 7 and 6 and may give more design options, e.g. such an arrangement may represent a combination of a pseudo crossover design and an H-style design of the harness. It is noted that the long axis of the ventral straps generally corresponds to the vertical axis (v) as depicted in FIGS. 1 to 3. A direction transverse to the long axis of the ventral strap therefore generally corresponds to the transverse axis (t) as depicted in FIGS. 1 to 3.

Figure 16:
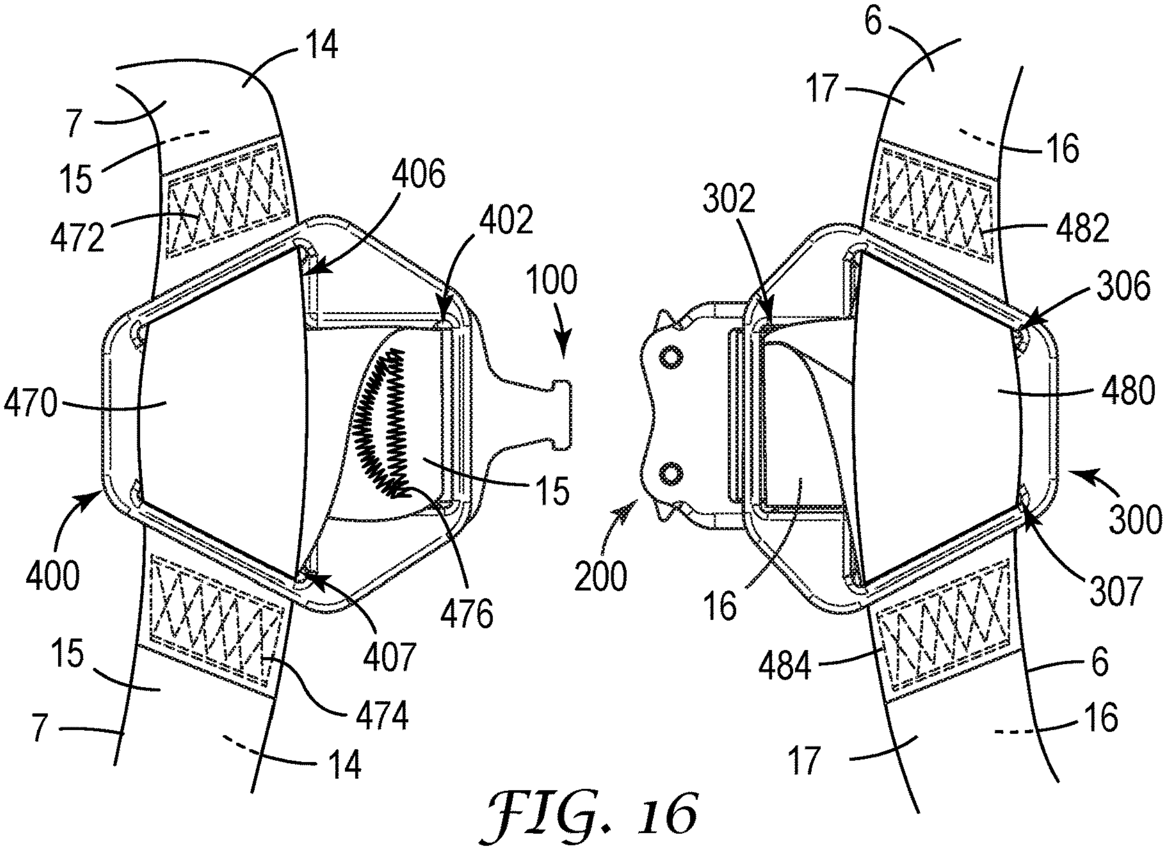
FIG. 16 is a rear view of the ventral buckle as shown in FIG. 10 with an embodiment of an additional connection strap.
Figure 17:
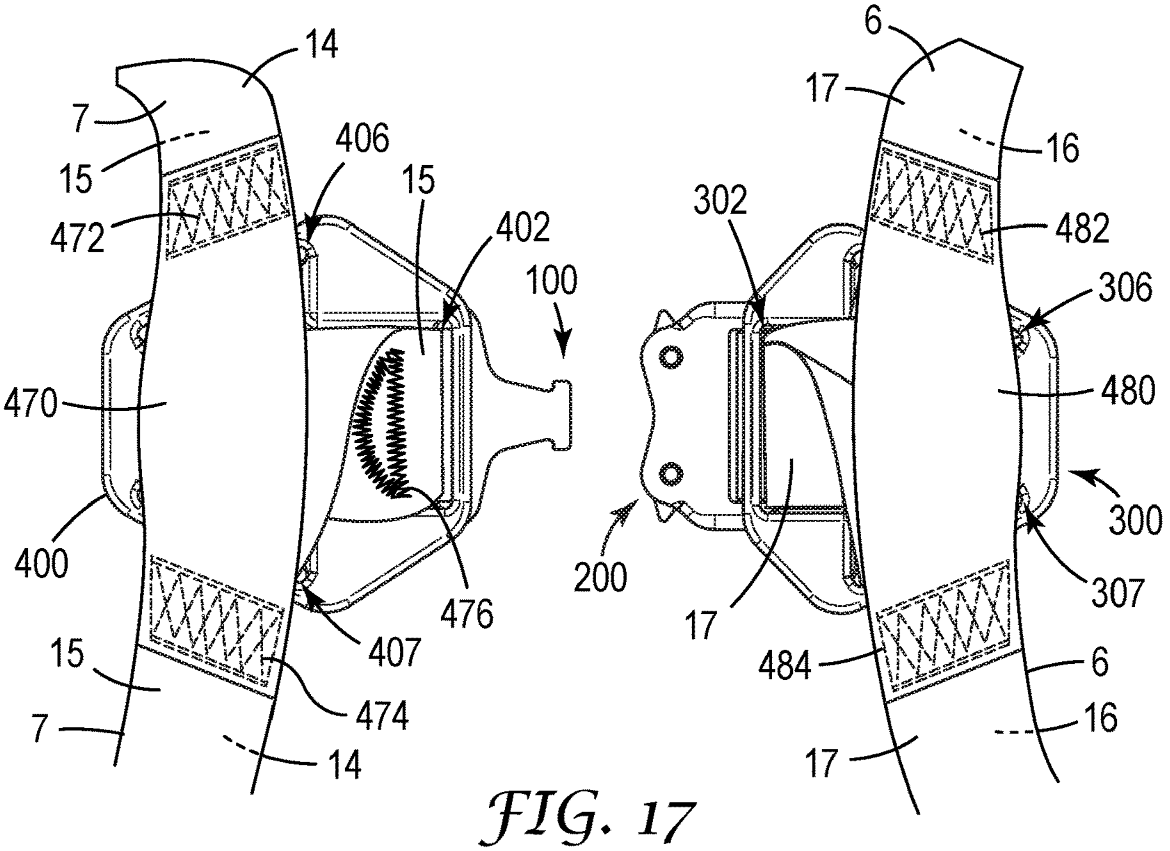
FIG. 17 is a rear view of the ventral buckle as shown in FIG. 10 with another embodiment of an additional connection strap.

FIGS. 16 and 17 show a rear view of the buckle portions 100, 200 and the ventral straps 6 and 7 as shown in FIG. 10 according to a different embodiment. In FIG. 16, an additional connection strap 470 is shown which connects the upper portion of the ventral strap 7 arranged above the ventral buckle 50 and thus before the folded portions 28, 29 and the twist or loop 18 with the lower portion of the ventral strap 7 arranged below the ventral buckle 50 and thus after the folded portion 28, 29 and the twist or loop 18. The connection strap 470 in the example shown is fixed to the upper and lower portions of the ventral strap 7, e.g. by stitching through the connection strap and the upper/lower portions of the ventral strap 7 indicated with 472 and 474. Similarly, a connection strap 480 is arranged to connect the upper and lower portions of the ventral strap 6 which are arranged in a similar way as upper and lower portions of the ventral strap 7, i.e. the upper portion is arranged above the ventral buckle 50 and before the folded portions 28, 29 and the twist or loop 19 and the lower portion is arranged below the ventral buckle 50 and after the twist of loop 19. Connection strap 480 connects the upper and lower portions in a similar way and is fixed to these e.g. by stitching indicated with 482 and 484. In the example of FIG. 16, the connection strap 470 passes—together with the ventral straps 7—through the slots 406, 407 of the strap routing mechanism 400 and the connection strap 480 passes—together with the ventral strap 6—through the slots 306, 307 of the strap routing mechanism 300. An additional fixation for the folded portions 28, 29 of the ventral strap 7 is shown in FIG. 16, i.e. these are stitched together indicated with 476. Such a feature may be included in some embodiments, and may provide further stability to the arrangement of the ventral strap and prevent unwanted movement of the ventral buckle 50 formed by buckle portions 100, 200 relative to the ventral straps 7 and 6. FIG. 17 shows a similar arrangement of the connection straps 470, 480 as described above. In the example of FIG. 17, different to the arrangement as shown and described for FIG. 16, the connection straps 470, 480 do not pass through the slots 406, 407 of the strap routing mechanism 400 and do not pass through the slots 306, 307 of the strap routing mechanism 300. In other words, the connection straps 470, 480 are arranged outside of the slots 406, 407, 306, 307 and thereby sandwich these slots together with the ventral straps 7 and 6. The connection straps 470, 480 according to FIG. 17 may provide further stability and prevent unwanted movement of the ventral buckle 50 formed by buckle portions 100, 200 relative to the ventral straps 7 and 6 in a similar way as described for the arrangement of FIG. 16.

Figure 11:
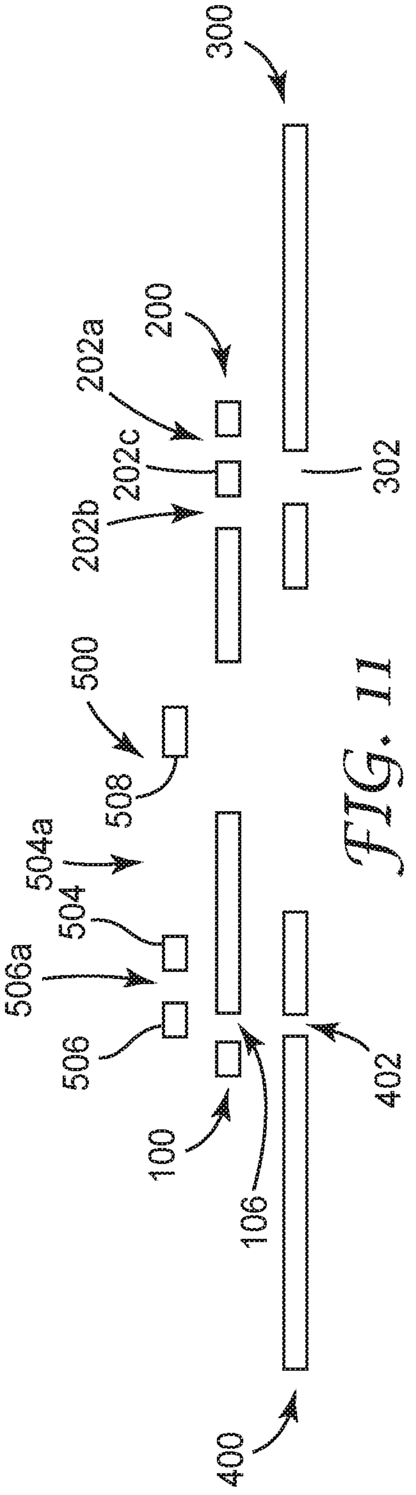
FIG. 11 is a schematic side view of the ventral buckle as shown in FIG. 5.

FIGS. 11 and 12 shows a schematic side view of the buckle portions 100, 200, the strap routing mechanism 300, 400 and the D-ring 500 in a layered arrangement. As can be seen from FIG. 11, the buckle portion 100 is laid onto the strap routing mechanism 400 such that vertically-elongated slots 402 and 106 of both are in a generally congruent arrangement. D-ring 500 is in turn laid onto buckle portion 100 such that the rod 506 of the D-ring is laid over the vertically-elongated slot 106 of the first buckle portion 100. The vertically-elongated slot 506*a* of the D-ring 500 is formed by rod 506 and 504 of the D-ring, see also FIG. 6. The ring 508 of the D-ring 500 is also visible in FIG. 11, wherein an opening 504*a* is formed by the ring 508 and the rod 504, see also FIG. 6. Such an opening may, for example, receive a hook or carabiner from a safety rope (not shown here). FIG. 11 further shows the layered arrangement of the strap routing mechanism 300 with the second buckle portion 200 laid thereon such that a rod 202*c* of the second buckle portion 200, which is located between the vertically-elongated slot 202*a* and the second vertically-elongated slot 202*b*. These are arranged on the second buckle portion such that the rod 202*c* is in a congruent arrangement with the underneath arranged vertically-elongated slot 302 of the strap routing mechanism 300. In FIG. 11, the ventral straps are omitted (please see FIG. 12). FIG. 12 shows in addition to the layered arrangement of the buckle portions 100, 200, the strap routing mechanisms 300, 400 and the D-ring as shown in FIG. 11 also the ventral straps 7 and 6 and how these are arranged. As can be seen from FIG. 12, ventral strap 7 comprises two layered portions 30, 32 in an overlap relation passing through the vertically-elongated slot 402 of the strap routing mechanism 400 and through the vertically elongate slot 106 of the first buckle portion 100. Loop 18 is formed on one end of the two layered portions 30, 32 which encompasses the rod 506 of the D-ring 500 thereby securing the D-ring 500 and first buckle portion 100 to the ventral strap 7 and securing the D-ring 500 in a desired position relative to the first buckle portion. FIG. 12 further shows the ventral strap 6 comprising two layered portions 34, 36 being in an overlap relation passing through the vertically elongate slot 302 of the strap routing mechanism 300. Similar to the ventral strap 7, loop 19 is formed by the two layered portions 34, 36 on one end thereof which encompasses the rod 202*c* of the second buckle portion 200 thereby securing the buckle portion 200 to the ventral strap 6.

Figure 13:
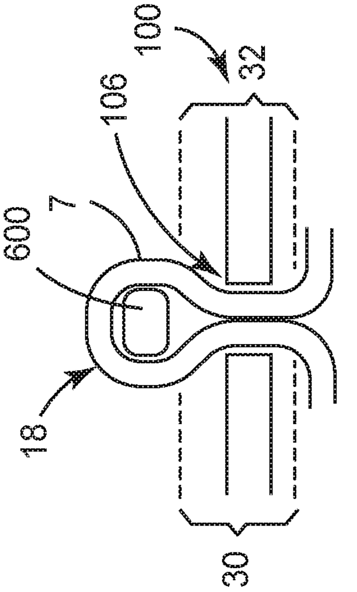
FIG. 13 is a side view of a first embodiment of a strap securing means including a ventral strap.
Figure 15:
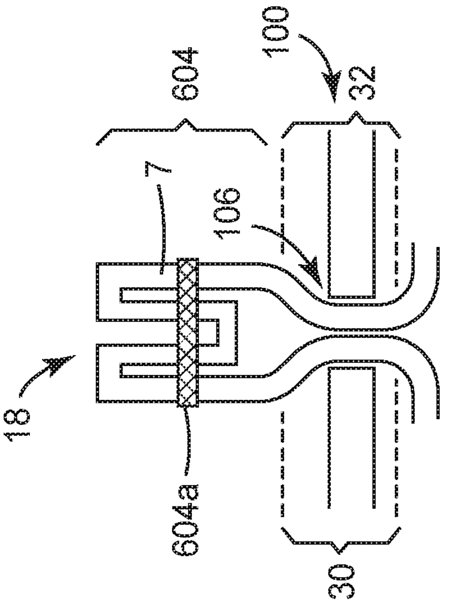
FIG. 15 is a side view of yet a further embodiment of a strap securing means including a ventral strap.
Figure 14:
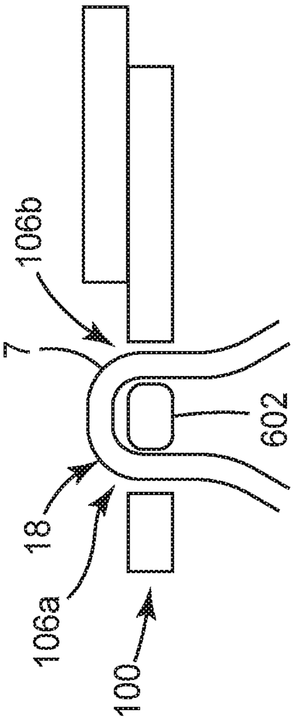
FIG. 14 is a side view of a further embodiment of a strap securing means including a ventral strap.

FIGS. 13 to 15 show a schematic side view of the first buckle portion 100 and how the ventral strap 7 is attached to the buckle portion 100 thereby securing the buckle portion 100 to the ventral strap 7. FIG. 13 illustrates a strap securing means comprising the ventral strap 7 passing with two layered portions 30, 32 thereof through the vertically-elongated slot 106 thereby forming a loop 18 which encompasses a rod 600. Rod 600 is separate from the buckle portion 100 and is configured and arranged such that the loop 18 is prevented from slipping through the vertically-elongated slot 106. For example, rod 600 (together with the two layers of the encompassing ventral strap 7 are greater in thickness than the width of the vertically-elongated slot 106. Another option may be that the length of the rod 600 is greater than the length of the vertically-elongated slot 106 such that slipping through of the rod 600 and the loop 18 is prevented. Although one of the above options may be sufficient to secure the buckle portion 100 at the ventral strap 7, a combination of a greater width and greater length of the rod 600 is conceivable. It is also conceivable that rod 600 is secured to loop 18 of the ventral strap 7, e.g. by clamping or stitching. FIG. 14 shows another option of the strap securing means comprising a rod 602 which is an integral part of the buckle portion 100. Two vertically-elongated slots 106*a*, 106*b* are formed side-by-side with the rod 602 such that one layer of the ventral strap 7 passes through each of the vertically-elongated slots 106*a*, 106*b* and thereby encompasses the rod 602. Thus, the buckle portion 100 is secured to the ventral strap 7 thereby. FIG. 15 shows a further option of the strap securing means comprising a thickened portion 604 formed by several layers of the ventral strap 7 which are—in the embodiment shown—fixed together, for example, by stitching 604*a*. Other fixation means are conceivable, e.g. clamping, gluing or other suitable means. Similar to FIG. 13, two layers 30, 32 of the ventral strap 7 pass through the vertically-elongated slot 106 of the buckle portion 100 being in an overlap relation. Although FIGS. 13 to 15 exemplarily refer to ventral strap 7 and the two layered portions 30, 32 thereof, it is understood that such an arrangement may also be present on the ventral strap 6 as well.

A feature of at least some of the embodiments disclosed herein is that at least when first and second buckle portions 100 and 200 are detached from each other, first buckle portion 100 cannot be slidably moved along first ventral strap 7, and second buckle portion 200 can similarly not be slidably moved along second ventral strap 6. In other words, when buckle portions 100 and 200 are in the general configuration shown in FIG. 2, the user may use a strap fitting means (not shown here) so that the upward/downward location of buckle 50 can thus be chosen as desired, e.g., to provide the best fit to the particular body shape of a user. Such a strap fitting means may take the form of e.g. a strap adjuster that can be used to adjust the length of the strap (and to handle any excess strap length) as desired. Exemplary strap adjusters are described, e.g., in U.S. Pat. No. 8,794,378 as noted earlier herein.

As noted, in many embodiments first and second buckle portions 100 and 200 and components thereof, may be made of any suitable material. In some embodiments, any such component may be made of any suitable metal, e.g., steel or aluminum. In various embodiments, such a component may be a forged body or a cast body; or, it may be made of sheet metal that is formed (e.g., bent) into the desired shape using standard sheet metal forming techniques.

In some embodiments, some part of a buckle portion (in particular, any areas that are to be regularly contacted by the fingers of a user) may be partially encased in an overmolded organic polymeric resin. Overmolding can be performed, e.g., by taking a previously-formed metal body and inserting it at least partially into an injection-molding cavity so that an organic polymeric molding resin can be formed atop, and adhered to, the desired portions of the body. In some embodiments a plate and/or padding may be provided, e.g., inward of first and/or second buckle portions 100 and/or 200, in order to provide enhanced cushioning between the ventral buckle 50 and the user's chest or torso. Any such plate and/or padding can be of any suitable design, relying, e.g., on one or more layers of foam or other resilient material.

A ventral buckle as disclosed herein (and a pseudo-crossover arrangement of ventral straps) can be used with any suitable fall-protection harness. Such harnesses are well known and may be used with a wide variety of fall-protection apparatus, methods and systems. In some embodiments, the fall-protection harness, and the ventral buckle thereof, may meet the requirements of ANSI Z359.12.

Fall-protection apparatus and systems (e.g., lanyards, self-retracting lifelines, positioning systems, horizontal systems, vertical systems, climb-assist systems, descenders, etc.), fall-protection anchorages, components of such apparatus, systems, equipment, and so on, with which the arrangements disclosed herein may find use, are described, e.g., in the 3M DBI-SALA Fall Protection Full Line Catalog 2018.

It is emphasized that a user of any fall-protection device, apparatus, system, or component thereof that includes a harness and/or ventral buckle as described herein is tasked with carrying out any appropriate steps, actions, precautions, operating procedures, etc., as required by applicable laws, rules, codes, standards, and/or instructions. That is, under no circumstances will the presence of any arrangement disclosed herein relieve a user of the duty to follow all appropriate laws; rules; codes; standards as promulgated by applicable bodies (e.g., ANSI); instructions as provided by the manufacturer of the fall-protection system, apparatus or components; instructions as provided by the entity in charge of a worksite, and so on.

It will be understood that the particular designs of the buckle portions presented herein are exemplary and that variations may be present but which may still allow buckle portions to form a ventral buckle that achieves a pseudo-crossover arrangement of straps. While the buckle portions (and 180 degree twist arrangements) disclosed herein are discussed primarily in the context of being used to form a ventral buckle for use with ventral straps of a fall-protection safety harness, in various embodiments such buckle portions and/or arrangements of straps could be used with other straps of a fall-protection safety harness, with straps of a general-purpose harness, or, with straps for any desired purpose. Such uses may not necessarily involve the interaction of two ventral straps with each other. Nor would the two straps necessarily need to be more or less parallel to each other when the buckle portions are detached from each other (as in FIG. 2) nor would they necessarily need to approach each other more or less tangentially when the buckle portions are attached to each other (as in FIG. 3). Rather, one strap might, e.g., approach the other strap more or less perpendicularly, or at any suitable angle. Thus, in various embodiments, the approaches disclosed herein may be used, e.g., to interconnect a ventral strap with a waist strap or a leg strap, a waist strap with a leg strap, and so on.

In summary, all such variations and combinations are contemplated as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). To the extent that there is any conflict or discrepancy between this specification as written and the disclosure in any document that is incorporated by reference herein but to which no priority is claimed, this specification as written will control.

Embodiments

1. A fall-protection safety harness configured so that when the harness is worn by a user, a first ventral strap of the harness extends from the right shoulder of the user to the right hip of the user and a second ventral strap of the harness extends from the left shoulder of the user to the left hip of the user, wherein a first buckle portion is mounted on the first ventral strap and a second buckle portion is mounted on the second ventral strap, the first and second buckle portions being detachably attached to each other to form a ventral buckle, wherein the first and second ventral straps and the first and second buckle portions are configured so that the ventral buckle is at least generally aligned with a sagittal plane of the user and harness, each of the buckle portions comprise a vertically-elongated slot that is oriented within plus or minus 20 degrees of a vertical axis of the harness, wherein at least one of the ventral straps comprises at least two fold portions formed by an upper portion of the ventral strap folded at least partially onto itself and by a lower portion of the ventral strap folded at least partially onto itself, wherein the at least one strap performs a 180 degrees twist at the vertically-elongated slot of the buckle portion mounted to the ventral strap thereby forming a securing portion on the ventral strap which is located between the two fold portions and wherein the at least one buckle portion is secured to the at least one strap at the securing portion of the strap.

2. The fall-protection safety harness according to embodiment 1, wherein the 180 degrees twist provide a loop on the ventral strap.

3. The fall protection safety harness according to any one of embodiments 1 or 2, wherein the upper and lower portions of the ventral strap are folded such that a transverse strap portion is formed in which two layered portions of the ventral strap are in a substantially congruent overlap relation.

4. The fall protection safety harness according to embodiment 3, wherein the transverse strap portion faces away from a ventral strap towards the buckle part to which the ventral strap is attached to.

5. The fall protection safety harness according to any one of embodiments 3 or 4, wherein the transverse strap portion provides for an excess length of the ventral strap, wherein the transverse strap portion is oriented substantially perpendicular to the long axis of the ventral strap and to the sagittal plane of the user.

6. The fall protection safety harness according to any one of embodiments 3 to 5, wherein the longitudinal axes of the folded portion and of the transverse strap portions are angled to each other, wherein the axes preferably enclose an angle of between substantially 0 degree to substantially 90 degree.

7. The fall protection safety harness according to one of embodiments 2 to 6, further comprising a strap securing means, wherein the loop is arranged around the strap securing means.

8. The fall protection safety harness according to embodiment 7, wherein the strap securing means is formed by a rod with an elongation larger than the vertically-elongated slot, wherein the loop encompasses the rod.

9. The fall protection safety harness according to embodiment 8, wherein the rod is formed by a portion of the buckle portion being arranged adjacent to the vertically-elongated slot.

10. The fall protection safety harness according to any one of embodiments 8 or 9, wherein the fall protection safety harness further comprises a D-ring and wherein the rod is formed by a portion of the D-ring.

11. The fall protection safety harness according to embodiment 10, wherein the strap passes through the vertically-elongated slot and passes through a slot in a D-ring before returning to the vertically-elongated slot, whereby the D-ring is held in position proximate the buckle portion by the ventral strap and is not directly attached or connected to the first buckle portion of the second buckle portion by way of any metal component.

12. The fall protection safety harness according to any one of embodiments 7 to 11, wherein the securing portion of the ventral strap is formed by a thickened portion of the ventral strap and wherein the strap securing means is formed by the vertically-elongated slot, wherein the thickened portion of the ventral strap is larger in thickness than the width of the vertically-elongated slot, preferably the thickened portion is formed by two or more layered portions of the ventral strap being stitched together.

13. The fall-protection safety harness according to any one of preceding embodiments, wherein the generally vertically-elongated slot is a substantially vertically-elongated slot that is oriented within plus or minus 10 degrees of a vertical axis of the harness; and wherein the buckle portion that comprises the substantially vertically-elongated slot also comprises at least one auxiliary elongate slot that exhibits a long axis that is oriented at an angle of from 15 degrees to substantially 90 degrees relative to the substantially vertically-elongated slot.

14. The fall-protection safety harness according to embodiment 13, wherein the vertically-elongated slot and/or the at least one auxiliary slot are integrally formed with the buckle part.

15. The fall-protection safety harness according to embodiment 13, wherein the vertically-elongated slot and/or the at least one auxiliary slot are attached to the buckle part, wherein preferably the vertically-elongated slot and the at least one auxiliary slot are integrally formed with each other.

16. The fall-protection safety harness according to any one of embodiments 13 to 15, further comprising a strap routing mechanism in which the vertically-elongated slot and at least one auxiliary slot are arranged, wherein the buckle part comprises a vertically-elongated slot, wherein the vertically-elongated slots of the strap routing mechanism and of the buckle part are in an overlap relation such that the ventral strap passes through the vertically-elongated slots of the buckle part and of the strap routing mechanism.

17. The fall protection safety harness according to embodiment 16, wherein the buckle parts comprises metal and wherein the strap routing mechanism comprises a polymeric material.

18. The fall-protection safety harness according to any one of the preceding embodiments, further comprising a connection strap fixedly connected to the upper and the lower portion of the ventral strap such that a load acing upon the upper strap is also transmitted to the lower strap and such that a load acing upon the lower strap is also transmitted to the upper strap.

19. The fall-protection safety harness according to embodiment 18, wherein the connection strap is stitched to the upper and/or lower portion of the ventral strap.

20. The fall-protection safety harness according to any one of embodiments 13 to 19, wherein the fall protection safety harness comprises a connection strap and wherein the connection strap passes through the at least one auxiliary slot.

21. The fall-protection safety harness according to any one of embodiments 3 to 21, wherein the two portions of the transverse strap portion are fixedly connected to each other, preferably by stitching.

22. The fall-protection safety harness according to any one of preceding embodiments, wherein each of the ventral straps comprises at least two fold portions each formed by an upper portion of the ventral strap folded at least partially onto itself and by a lower portion of the ventral strap folded at least partially onto itself, wherein each of the straps performs a 180 degrees twist at the vertically-elongated slot of the buckle portion mounted to the ventral strap thereby forming a securing portion on the ventral strap which is located between the two fold portions, wherein each of the buckle portions is secured to the at least one strap at the securing portion of the strap.

23. The fall-protection safety harness according to any one of embodiments 7 to 22, wherein a strap securing means is arranged at both ventral straps and buckle parts, respectively.

24. The fall-protection safety harness according to any one of embodiments 16 to 23 wherein a strap routing mechanism is arranged at both ventral straps.

25. The fall-protection safety harness according to any one of the preceding embodiments, wherein the first and second buckle portions are directly attached to each other by way of metal components of the first and second buckle portions and wherein the first and second buckle portions are not directly attached or connected to each other by way of any flexible strap or webbing.

26. The fall-protection safety harness according to any one of the preceding embodiments, wherein the first buckle portion comprises a base plate and a cover plate that are permanently attached to each other by multiple mechanical fasteners, and wherein the base plate and the cover plate of the first buckle portion are configured to define a receiving cavity into which a catch of the second buckle portion can be received in order to attach the first and second buckle portions to each other, and wherein the base plate and the cover plate also define an opening into which the catch of the first buckle portion can be inserted to reach the receiving cavity.

27. The fall-protection safety harness of embodiment 26, wherein the first buckle portion comprises first and second pivotable latches that are pivotably mounted to the base plate and/or to the cover plate and that are pivotably movable between a first, unlatched position that allows the catch of the second buckle portion to exit the receiving cavity of the first buckle portion to detach the first and second buckle portions from each other; and, a second, latched position that securely holds the catch of the second buckle portion within the receiving cavity of the first buckle portion and prevents the catch from being removed from the receiving cavity.

28. The fall-protection safety harness of embodiment 27, wherein the first and second pivotable latches of the first buckle portion are biased by biasing members toward the second, latched position, and wherein the first and second pivotable latches are configured so that the fingers of a user can overcome the biasing force of the biasing members and manually pivot the first and second latches from the second, latched position into the first, unlatched position by manipulating exposed ear portions of the first and second pivotable latches.

29. The fall-protection safety harness of embodiment 28, wherein the first and second pivotable latches of the first buckle portion are configured so that moving the first and second buckle portions toward each other in a transverse direction so that the catch of the second buckle portion enters the receiving cavity of the first buckle portion, causes a leading end of a head of the catch to impinge on contact surfaces of the first and second pivotable latches and overcomes the biasing force of the biasing members so as to urge the first and second pivotable latches to pivotably move to their second, unlatched position.

30. The fall-protection safety harness of embodiment 29, wherein the first and second pivotable latches of the first buckle portion are configured so that sufficient penetration of the catch of the second buckle portion into the receiving cavity of the first buckle portion causes the biasing force exerted by the biasing members to urge the first and second latches to automatically pivotably move into the second, latched position to securely hold the catch within the receiving cavity.

31. The fall-protection harness according to any one of the preceding embodiments, wherein the harness, and the ventral buckle, meet the requirements of ANSI Z359.12.

32. A method of donning the fall-protection safety harness of any of embodiments 1-31, the method comprising wrapping an upper portion of the safety harness about the shoulders and upper torso of the user in the manner of a jacket and then attaching the first and second buckle portions to each other to form the ventral buckle, wherein the method does not require any step of pulling the harness downward over the heat and shoulders of the user in the manner of a pullover sweater.

What is claimed is:

1. A fall-protection safety harness configured so that when the harness is worn by a user, a first ventral strap of the harness extends from the right shoulder of the user to the right hip of the user and a second ventral strap of the harness extends from the left shoulder of the user to the left hip of the user, wherein a first buckle portion is mounted on the first ventral strap and a second buckle portion is mounted on the second ventral strap, the first and second buckle portions being detachably attached to each other to form a ventral buckle, wherein the first and second ventral straps and the first and second buckle portions are configured so that the ventral buckle is at least generally aligned with a sagittal plane of the user and harness, each of the buckle portions comprise a vertically-elongated slot that is oriented within plus or minus 20 degrees of a vertical axis of the harness, wherein at least one of the ventral straps comprises at least two fold portions formed by an upper portion of the ventral strap folded at least partially onto itself and by a lower portion of the ventral strap folded at least partially onto itself, wherein the at least one strap performs a 180 degrees twist at the vertically-elongated slot of the buckle portion mounted to the ventral strap thereby forming a securing portion on the ventral strap which is located between the two fold portions and wherein the at least one buckle portion is secured to the at least one strap at the securing portion of the strap.

2. The fall-protection safety harness according to claim 1, wherein the 180 degrees twist provides a loop on the ventral strap.

3. The fall protection safety harness according to claim 1, wherein the upper and lower portions of the ventral strap are folded such that a transverse strap portion is formed in which two layered portions of the ventral strap are in a substantially congruent overlap relation.

4. The fall protection safety harness according to claim 3, wherein the transverse strap portion faces away from a ventral strap towards the buckle part to which the ventral strap is attached to.

5. The fall protection safety harness according to claim 3 wherein the transverse strap portion provides for an excess length of the ventral strap, wherein the transverse strap portion is oriented substantially perpendicular to the long axis of the ventral strap and to the sagittal plane of the user.

6. The fall protection safety harness according to claim 3, wherein the longitudinal axes of the folded portion and of the transverse strap portions are angled to each other, wherein the longitudinal axes enclose an angle of between substantially 0 degrees to substantially 90 degrees.

7. The fall protection safety harness according to claim 2, further comprising a strap securing means, wherein the loop is arranged around the strap securing means.

8. The fall-protection safety harness according to claim 1, wherein the generally vertically-elongated slot is a substantially vertically-elongated slot that is oriented within plus or minus 10 degrees of a vertical axis of the harness; and wherein the buckle portion that comprises the substantially vertically-elongated slot also comprises at least one auxiliary elongate slot that exhibits a long axis that is oriented at an angle of from 15 degrees to substantially 90 degrees relative to the substantially vertically-elongated slot.

9. The fall-protection safety harness according to claim 8, wherein the vertically-elongated slot and/or the at least one auxiliary slot are integrally formed with the buckle part.

10. The fall-protection safety harness according to claim 8, further comprising a strap routing mechanism in which the vertically-elongated slot and at least one auxiliary slot are arranged, wherein the buckle part comprises a vertically-elongated slot, wherein the vertically-elongated slots of the strap routing mechanism and of the buckle part are in an overlap relation such that the ventral strap passes through the vertically-elongated slots of the buckle part and of the strap routing mechanism.

11. The fall-protection safety harness according to claim 1, further comprising a connection strap fixedly connected to the upper and the lower portion of the ventral strap such that a load acing upon the upper strap is also transmitted to the lower strap and such that a load acting upon the lower strap is also transmitted to the upper strap.

12. The fall-protection safety harness according to claim 11, wherein the connection strap is stitched to the upper and/or lower portion of the ventral strap.

13. The fall-protection safety harness according to claim 8, wherein the fall protection safety harness comprises a connection strap and wherein the connection strap passes through the at least one auxiliary slot.

14. The fall-protection safety harness according to claim 3, wherein the two portions of the transverse strap portion are fixedly connected to each other, by stitching.

15. The fall-protection safety harness according to claim 1, wherein each of the ventral straps comprises at least two fold portions each formed by an upper portion of the ventral strap folded at least partially onto itself and by a lower portion of the ventral strap folded at least partially onto itself, wherein each of the straps performs a 180 degrees twist at the vertically-elongated slot of the buckle portion mounted to the ventral strap thereby forming a securing portion on the ventral strap which is located between the two fold portions, wherein each of the buckle portions is secured to the at least one strap at the securing portion of the strap.

16. The fall-protection safety harness according to claim 7, wherein a strap securing means is arranged at both ventral straps and buckle parts, respectively.

17. The fall-protection safety harness according to claim 10 wherein a strap routing mechanism is arranged at both ventral straps.

18. The fall-protection safety harness according to claim 1, wherein the first and second buckle portions are directly attached to each other by way of metal components of the first and second buckle portions and wherein the first and second buckle portions are not directly attached or connected to each other by way of any flexible strap or webbing.

19. The fall-protection safety harness according to claim 1, wherein the first buckle portion comprises a base plate and a cover plate that are permanently attached to each other by multiple mechanical fasteners, and wherein the base plate and the cover plate of the first buckle portion are configured to define a receiving cavity into which a catch of the second buckle portion can be received in order to attach the first and second buckle portions to each other, and wherein the base plate and the cover plate also define an opening into which the catch of the first buckle portion can be inserted to reach the receiving cavity.

20. A method of donning the fall-protection safety harness of claim 1, the method comprising wrapping an upper portion of the safety harness about the shoulders and upper torso of the user in the manner of a jacket and then attaching the first and second buckle portions to each other to form the ventral buckle, wherein the method does not require any step of pulling the harness downward over the head and shoulders of the user in the manner of a pullover sweater.

* * * * *